United States Patent
Sharma et al.

(10) Patent No.: US 11,113,707 B1
(45) Date of Patent: Sep. 7, 2021

(54) ARTIFICIAL INTELLIGENCE IDENTIFICATION OF HIGH-VALUE AUDIENCES FOR MARKETING CAMPAIGNS

(71) Applicant: Isolation Network, Inc., Encino, CA (US)

(72) Inventors: Shantanu K Sharma, La Jolla, CA (US); Daniel Cownden, Victoria (CA); James Parks, Victoria (CA); Jia Wen Tian, Victoria (CA); Keivan Monfared, Victoria (CA); Yu-Chien Huang, Victoria (CA)

(73) Assignee: Isolation Network, Inc., Encino, CA (US)

( * ) Notice: Subject to any disclaimer, the term of this patent is extended or adjusted under 35 U.S.C. 154(b) by 0 days.

(21) Appl. No.: 17/156,000

(22) Filed: Jan. 22, 2021

(51) Int. Cl.
*G06Q 30/02* (2012.01)
*G06N 5/04* (2006.01)
*G06N 20/00* (2019.01)

(52) U.S. Cl.
CPC ........... *G06Q 30/0205* (2013.01); *G06N 5/04* (2013.01); *G06N 20/00* (2019.01); *G06Q 30/0206* (2013.01)

(58) Field of Classification Search
CPC ........... G06Q 30/0205; G06Q 30/0206; G06N 20/00; G06N 5/04
USPC ....................................................... 705/7.34
See application file for complete search history.

(56) References Cited

U.S. PATENT DOCUMENTS

| | | | |
|---|---|---|---|
| 8,676,736 B2 | 3/2014 | Pilaszy et al. | 706/46 |
| 8,739,207 B1 | 5/2014 | Black et al. | 725/35 |
| 8,880,439 B2 | 11/2014 | Archambeau et al. | 706/12 |
| 8,983,888 B2 | 3/2015 | Nice et al. | 706/45 |

(Continued)

FOREIGN PATENT DOCUMENTS

| | | |
|---|---|---|
| JP | 2016-510913 | 4/2016 |
| WO | 2017/178870 | 10/2017 |

OTHER PUBLICATIONS

"Alternating Least Squares for Personalized Ranking" to Takács et al, Sep. 5, 2012 (Year: 2012).*

(Continued)

*Primary Examiner* — Charles Guiliano
*Assistant Examiner* — Po Han Lee
(74) *Attorney, Agent, or Firm* — Venable LLP

(57) ABSTRACT

A marketing analytics pipeline that receives transaction-level trend reporting of media IP assets distributed on digital service providers (DSPs), the marketing analytics pipeline including a marketing action analytics hub configured to receive the growth and re-engagement opportunities from an opportunity detection analytics hub or from a marketing platform directly and to identify high growth potential audiences using predictive models of engagement; and a marketing platform configured to interact with the marketing action analytics hub and to create marketing campaigns based around the high growth potential audiences and suggest marketing actions to media IP asset managers and owners to deliver to the high growth potential audiences on appropriate marketing channels via targeted marketing campaigns. The marketing action analytics hub uses a geodemographic and interest-based targeting method of generating descriptions of high growth potential audiences.

8 Claims, 12 Drawing Sheets

(56) References Cited

U.S. PATENT DOCUMENTS

| | | | |
|---|---|---|---|
| 9,348,924 B2 | 5/2016 | Somekh et al. | G06F 16/9535 |
| 9,406,072 B2 | 8/2016 | Whitman | G06Q 30/02 |
| 10,325,289 B2 | 6/2019 | Koran | G06Q 30/0277 |
| 10,332,015 B2 | 6/2019 | Kawale et al. | G06Q 30/0282 |
| 10,346,871 B2 | 7/2019 | Jeon et al. | G06Q 30/0244 |
| 10,475,102 B2 | 11/2019 | Tang et al. | G06Q 30/0631 |
| 10,755,291 B1 | 8/2020 | Sharma et al. | G06Q 30/0254 |
| 2002/0123924 A1 | 9/2002 | Cruz | 705/7.24 |
| 2012/0030159 A1* | 2/2012 | Pilaszy | G06F 16/951 706/46 |
| 2016/0004874 A1 | 1/2016 | Ioannidis et al. | 713/165 |
| 2016/0012238 A1 | 1/2016 | Ioannidis et al. | 713/189 |
| 2016/0020904 A1 | 1/2016 | Ioannidis et al. | 713/174 |
| 2016/0260140 A1 | 9/2016 | Shirley et al. | G06Q 30/0277 |
| 2017/0206551 A1* | 7/2017 | Gupta | G06F 16/9535 |

OTHER PUBLICATIONS

Y. Hu, Y. Koren and C. Volinsky, "Collaborative Filtering for Implicit Feedback Datasets," 2008 Eighth IEEE International Conference on Data Mining, Pisa, 2008, pp. 263-272, doi: 10.1109/ICDM.2008.22.

* cited by examiner

ARTIFICIAL INTELLIGENCE IDENTIFICATION OF HIGH-VALUE AUDIENCES FOR MARKETING CAMPAIGNS

BACKGROUND

1. Technical Field

The field generally relates to the automatic detection of marketing opportunities, and the generation and execution of marketing campaigns, for media assets in the on-demand streaming market. The system and method primarily operate in the space between the platforms where the media are consumed by the user and the platforms where users can be reached.

2. Discussion of Related Art

Prior to the dominance of streaming consumption, the marketing efforts of media intellectual property (IP) asset managers and owners were focused on recent releases to drive one-off sales of singles and albums in a short window following release date. Currently, however, recurring streaming events, not purchases, are the primary monetizable events for media IP asset owners. Thus, there remains a need for systems and methods for determining how to best allocate promotional resources across the entirety of a media IP asset owner's catalog with the aim of driving recurrent streaming, not one-off purchases.

SUMMARY

An embodiment of the instant disclosure herein relates to a marketing analytics pipeline that receives transaction-level trend reporting of media IP assets distributed on digital service providers (DSPs), the marketing analytics pipeline including a marketing action analytics hub configured to receive the growth and re-engagement opportunities from an opportunity detection analytics hub or from a marketing platform directly and to identify high growth potential audiences using predictive models of engagement; and a marketing platform configured to interact with the marketing action analytics hub and to create marketing campaigns based around the high growth potential audiences and suggest marketing actions to media IP asset managers and owners to deliver to the high growth potential audiences on appropriate marketing channels via targeted marketing campaigns. The marketing action analytics hub uses a geodemographic and interest-based targeting method of generating descriptions of high growth potential audiences and is comprised of an offline model generation component and an online audience generation component.

According to further aspects, the offline model generation component is configured to use transaction-level trend data reports from a consumption database to fit statistical models based on consumption patterns of an entirety of distributed media IP assets on a regular cadence by clustering media IP assets into categories and employing an alternating least squares framework to generate a specific matrix factorization for each category by approximating an engagement matrix as a product of two latent factor matrices calculated by an approximation of the engagement matrix that minimizes a cost function over all possible values of the latent factor matrices. The cost function may include hyperparameters that are calculated to minimize errors between the engagement matrix and the approximation thereof, and the cost function may be repeatedly calculated by repeated calculations of the hyperparameters.

According to further aspects, the online audience generation component is comprised of a high growth potential audience identification component configured to receive both consumption data, media IP assets and marketing campaign goals from an opportunity detection analytics hub or directly from media IP asset managers/owners through a marketing platform and category specific trained statistical models from an online model selection component or an online model update component to produce a subset of high growth potential geodemographic groups chosen according to a goal-weighted predicted engagement score calculated by assessing both the engagement predicted by the statistical model in each geodemographic group as well as the alignment with the received marketing campaign goal for each geodemographic group where alignment is determined using both the model prediction of engagement and the observed engagement of each geodemographic group, for the purpose of ensuring consistency between the targeting priorities as indicated by the campaign goal and as represented by the chosen high growth potential geodemographic groups.

Embodiments contemplated herein include any and all of methods, apparatus, tangible computer-readable media and others, related to the description provided herein.

BRIEF DESCRIPTION OF THE DRAWINGS

Further objectives and advantages will become apparent from a consideration of the description, drawings, and examples.

DETAILED DESCRIPTION

Figure 1:
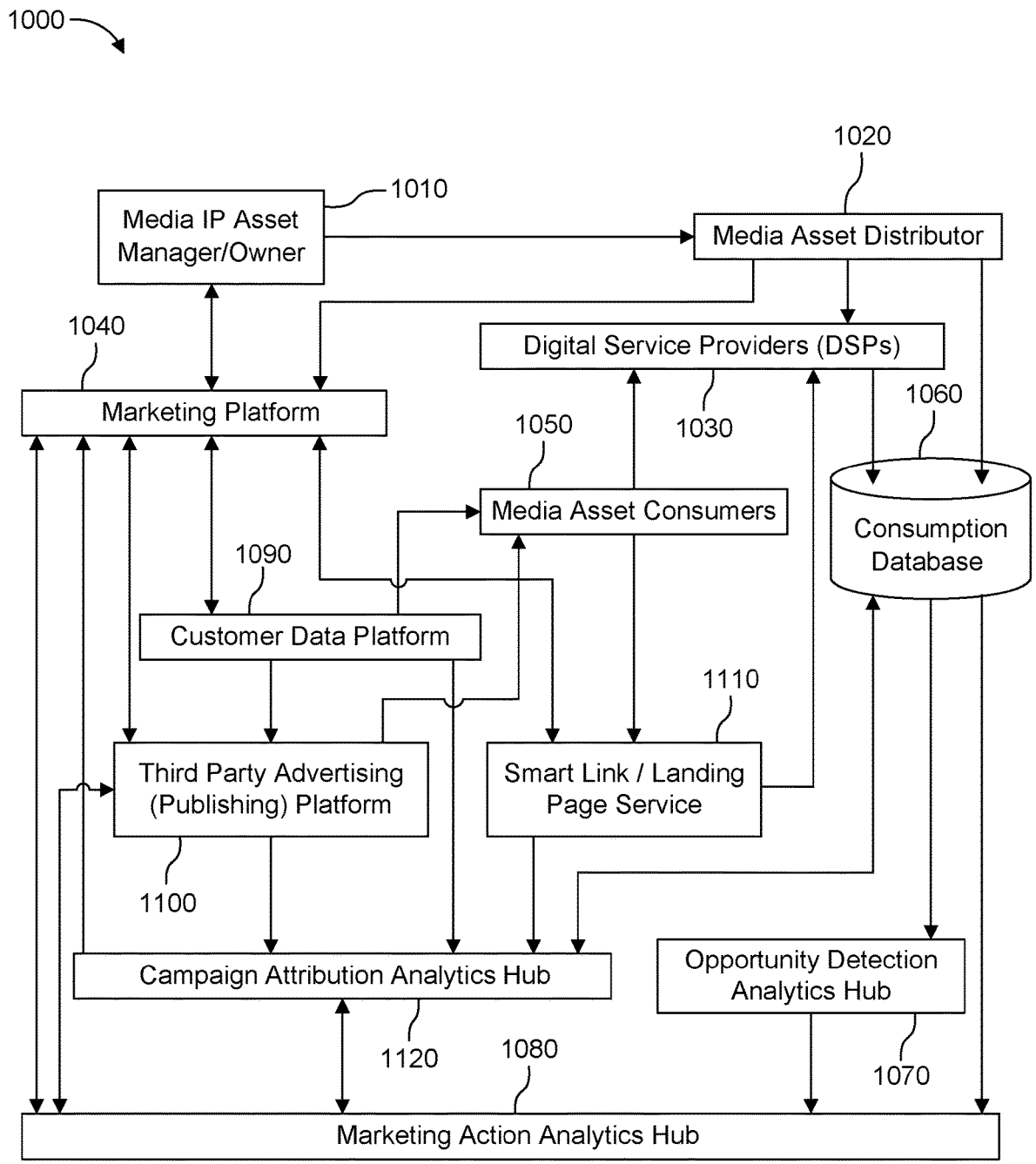
FIG. 1 shows a marketing analytics pipeline according to some embodiments of the disclosure.

Some embodiments of the current disclosure herein are discussed in detail below. In describing embodiments, specific terminology is employed for the sake of clarity. However, the disclosure herein is not intended to be limited to the specific terminology so selected. A person skilled in the relevant art will recognize that other equivalent components can be employed and other methods developed without departing from the broad concepts of the current disclosure herein. Any reference cited anywhere in this specification, including the Background and Detailed Description sections, is incorporated by reference in its entirety.

The recorded music industry has come to be dominated by on-demand streaming services (referred to as digital service providers (DSPs), e.g., Spotify, Apple Music). The dominant DSPs, as part of their contracts with the IP holders who license their content to these DSPs, provide detailed transaction-level reporting of all streaming events. This data provides unprecedented access and insight into how media asset consumers are engaging with specific IP, across multiple retail platforms.

DSPs charge consumers recurring subscription fees (and in some cases one-time fees or show advertisements) in exchange for access to large libraries of music, available on demand. This leads to fundamentally different patterns of music consumption than those found under previous purchase-based music consumption models, characterized by increased exploration and time spent engaging with music.

In contrast to DSP subscribers who pay fees independent of usage, DSPs predominantly pay media IP asset owners based on their IP's share of all streams on platform within a regional market over a given subscription billing period (typically monthly). Hence, a media IP asset owner's revenue is maximized when more media asset consumers stream their content more frequently than other content on a streaming platform. An additional consequence of this payment structure is that media assets generate revenues gradually over time as they are continually streamed by media asset consumers, not upfront in one-off purchases, as was characteristic of both physical and download media consumption.

Prior to the dominance of streaming consumption, the marketing efforts of media IP asset managers/owners were naturally focused on recent releases to drive one-off sales of singles/albums in the short window following release date. However, now that recurring streaming events, not purchases, are the primary monetizable events for media IP asset owners, increasing long term engagement for their entire catalog of media assets, regardless of release date, is now the focus. How to best allocate promotional resources across the entirety of a media IP asset owner's catalog with the aim of driving recurrent streaming, not one-off purchases, is a problem which some embodiments of the present disclosure address.

Reference is made to prior U.S. Pat. No. 10,755,291, "Artificial Intelligence Automation of Marketing Campaigns", which describes a method and system of advertising media IP assets to third-party advertising platform users based on the reporting received from DSPs (Digital Service Providers, e.g. Spotify, Apple Music, YouTube etc.) as part of a marketing action analytics hub component in a marketing analytics pipeline. This method first identifies anonymized high-value individual media asset consumers from transaction-level reporting provided by DSPs and stored in a consumption database and uses these high-value media asset consumers to inform the generation of a marketing campaign description to be used to target users on third-party advertising platforms.

This approach, while effective, relies on individual media asset consumer consumption histories derived from reporting provided by DSPs to inform the generation of these descriptions that are then used to target similar, and possibly the same, individuals on third-party advertising platforms. However, as concerns and regulations over customer data privacy increase (e.g. GDPR, CCPA, etc.) these methods either become no longer permissible since they attempt to connect individual media asset consumers to third-party advertising platform users across platforms, less effective as reported individual media asset consumer consumption histories decrease in length, or impossible as individual media asset consumer consumption histories are removed completely from DSP reporting.

The invention described herein provides a new method of identifying broad targeting criteria to reach high-value, high growth potential audiences on third-party advertising platforms using the detailed transaction-level reporting provided by the DSPs without the identification of high-value individual media asset consumers using individual media asset consumer consumption level data, e.g. personal consumption histories.

Third-party advertising platforms, e.g. Facebook/Instagram, Google Ads, etc., allow advertisers to provide "initial target criteria" when executing marketing campaigns on their platforms. To provide efficient advertising spend for their customers, i.e. advertisers, these advertising platforms incorporate internal algorithms that further refine these initial targeting criteria. This is achieved by optimizing advertisement engagement with respect to metrics specified by the advertiser, e.g. views, clicks, conversions, etc. An example of such a process is disclosed in U.S. Pat. No. 10,346,871, "Automatic Targeting of Content by Clustering Based On User Feedback Data".

While the initial targeting criteria aspect of this process is transparent and determined by the advertiser, the internal algorithms used by the advertising platform for further refinement are opaque to the advertiser, i.e. only the marketing campaign results are shared with advertisers, not the details of the specific targeting. The targeting refinement processes utilized by third-party advertising platforms require precise and appropriate initial targeting criteria from advertisers to reach their full effectiveness.

Strategies to take advantage of the opaque optimizations offered by third-party advertising platforms vary from market to market, product to product, and platform to platform. A general principle is to strike a balance between setting the initial targeting criteria to be broad enough so that the built-in optimization algorithms are not limited in scope while setting the initial targeting criteria to be specific enough so that less time and advertising money are spent on the optimization algorithms finding appropriate advertising platform users.

Recommender systems, particularly those using collaborative filtering are integral to the arts of online marketing, retail and other services. A recommender system conventionally attempts to predict the preference or choice of an individual user over a given catalog of items, e.g. products or services, and then recommends items to the user based on these predictions. Conversely such a recommender system can often be adapted to also provide a set of users most likely to engage with an item or rate it highly, which is of benefit to advertisers seeking to efficiently promote a given product or service, potentially providing a solution to the problem of identifying effective targeting criteria.

Within the art of recommender systems, collaborative filtering can refer generally to methods predicated on the assumption that for a given user, the choices of other users with similar past histories are likely to be predictive of the preferences or choices of the given user. In practice a common application of this basic principle is through the (partial) factorization of a user-item matrix, where individual users correspond to rows, items correspond to columns (or vice versa) and the values correspond to a user's preference for the item as represented by either an explicit rating, an implicit rating inferred from user behavior or some combination of the two.

The matrix factorization approach to collaborative filtering is known to be effective when ratings are implicitly inferred from user behavior as outlined in Y. Hu, Y. Koren and C. Volinsky, "Collaborative Filtering for Implicit Feedback Datasets," 2008 *Eighth IEEE International Conference on Data Mining*, Pisa, 2008, pp. 263-272, doi: 10.1109/ICDM.2008.22. As also noted in Y. Hu et al., Alternating Least Squares (ALS) methods are effective for achieving the desired factorization in a scalable manner in the implicit feedback case, and a novel adaptation of this approach to the specific case of on-demand streamed media assets is disclosed herein.

The ALS factorization method of collaborative filtering is further adapted in the case disclosed herein where items are specific media IP assets and individual users are replaced with specific geodemographic groups, where a geodemographic group is an element from the set of all combinations of selected factors available from DSP trend reporting, e.g. geographic regions, genders, ages, DSP subscriptions, etc. The entries (or ratings) in the matrix are then a domain-specific measure of engagement with a media IP asset by the DSPs' media asset consumers in a geodemographic group over a specified time period, derived from the multivariate consumption data reported by the DSPs.

The geodemographic and interest-based targeting method of generating descriptions of high growth potential audiences disclosed herein is informed in part by the targeting criteria options provided by third-party advertising platforms to advertisers. Typical categories include age, gender and geographic location at the city, regional, or territory level. In addition, advertising interests or keywords can be included or excluded to further restrict the initial targeting criteria. This method of targeting is then enabled by the inclusion of such geodemographic information in the trend reporting for media IP assets, obviating the need for individual consumer data, though reporting resolution with respect to these geodemographic features can vary significantly between DSPs. Additionally, geodemographic groups can vary greatly in population size and may be consolidated to allow for direct comparisons between geodemographic groups.

One benefit a geodemographic grouping targeting method offers is a privacy-first approach to collaborative filtering since it does not use or attempt to predict individual media asset consumer consumption histories to make recommendations. This allows the method to remain permissible and effective with respect to streaming media consumption even under highly restrictive data privacy regulations and standards.

However, this method does introduce an issue that is not present in the traditional individual user case. Within a large geodemographic group, e.g. males aged 18-24 living in New York, N.Y., there will be several large and distinct subgroups with totally disjoint media engagement histories, i.e. users from a group A will not have engaged with any of the same media assets as users from a group B. However, when engagement is aggregated at the geodemographic level, the same recommendations will be made both for users in group A and group B. This results in undesirable outcomes especially in the case where the goal is to drive better advertising spend efficiency, e.g. based on the strong engagement patterns of group A the method could recommend advertising to all males aged 18-24 living in New York, N.Y. on a third-party advertising platform, when the ideal outcome would be to advertise only to individuals from group A. While this ideal outcome is difficult to achieve without recourse to individual user level data, the issue can be mitigated by restricting the process to clusters of media IP assets that are a priori likely to have high audience overlap. Specifically, in the invention disclosed herein media IP assets are first clustered into categories. The engagement patterns of these geodemographic groups and media IP assets are then analyzed independently for each category. Using only geodemographic consumption patterns within a category of media IP assets mitigates the risk of overgeneralization identified above which decreases the incidence of inefficient marketing recommendations.

Conventional, user-focused, recommender systems often struggle with data sparsity issues, i.e. it is difficult to make recommendations for users or items with relatively few rankings. This applies in the case of streaming media consumption where most DSP media asset consumers have only engaged with a small fraction of the media IP assets distributed on the DSP. This issue of sparsity is reduced by shifting analyses from the individual to the geodemographic group. Additionally, inferring user preference from individual user behavior is inherently noisy. For example, the same frequency of repeat consumption for one media IP asset may indicate different levels of preference depending on the baseline engagement patterns of individual media asset consumers. Replacing individual consumers with geodemographic groups circumvents these issues by reducing sparsity and averaging out individual variation which allows for robust population level measures of engagement.

Marketing Analytics Pipeline

FIG. 1 is a schematic of a marketing analytics pipeline 1000 according to some embodiments of the present disclosure. As shown in FIG. 1, the marketing analytics pipeline 1000 in this embodiment includes Media IP Asset Manager/Owner 1010, Media Asset Distributor 1020, Digital Service Providers (DSPs) 1030, Marketing Platform 1040, Media Asset Consumers 1050, Consumption Database 1060, Opportunity Detection Analytics Hub 1070, Marketing Action Analytics Hub 1080, Customer Data Platform 1090, Third-Party Advertising (Publishing) Platform 1100, Smart Link/Landing Page Service 1110, and Campaign Attribution Analytics Hub 1120. Each component is responsible for different and sometimes overlapping tasks, and each is discussed below. Some embodiments need not include all components, and need not include all of the tasks or the specific distribution of tasks as described herein.

Briefly, according to one aspect described herein, the marketing analytics pipeline 1000 receives transaction-level trend reporting of media IP assets distributed on DSPs 1030. The marketing analytics pipeline 1000 includes an opportunity detection analytics hub 1070 configured to monitor consumption profiles of the media IP assets and automatically detect growth and re-engagement opportunities as they occur. The marketing analytics pipeline 1000 includes a marketing action analytics hub 1080 configured to receive the growth and re-engagement opportunities from the opportunity detection analytics hub 1070, or from the marketing platform 1040 directly, and to identify high growth potential audiences using predictive models of engagement. The marketing analytics pipeline 1000 includes a marketing platform 1040 configured to interact with the marketing action analytics hub 1080 and to create marketing campaigns based around the high growth potential audiences and suggest marketing actions to media IP asset managers and owners 1010 to deliver to the high growth potential audiences on appropriate marketing channels via targeted marketing campaigns. The marketing analytics pipeline 1000 includes a campaign attribution analytics hub 1120 configured to use data from a consumption database 1060, the marketing platform 1040, a customer data platform 1090, and third-party advertising platforms 1100 to accurately attribute the effect of the marketing campaigns.

Figure 2:
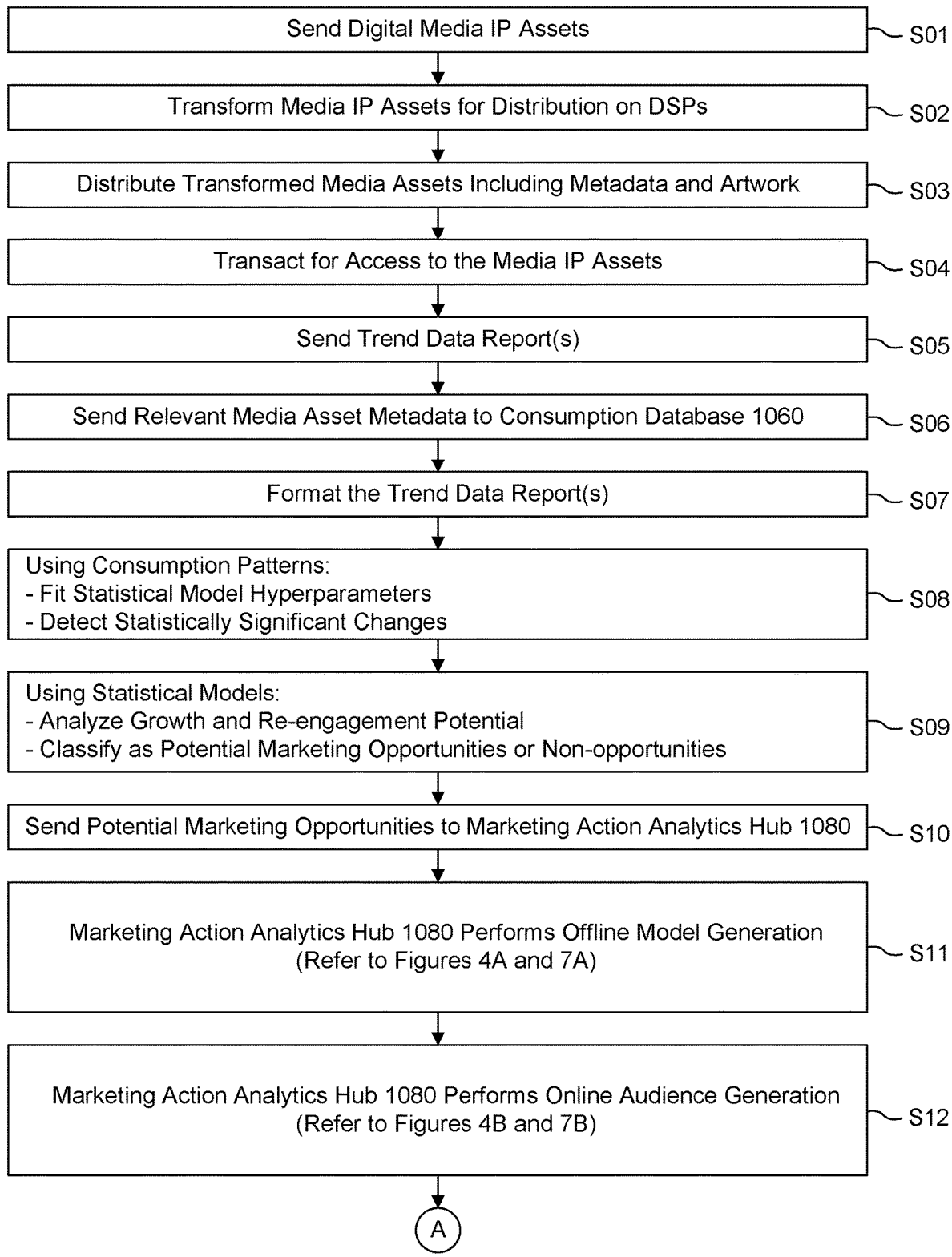
FIG. 2 is a flow diagram depicting a plurality of steps executed by the marketing analytics pipeline according to some embodiments of the disclosure.
Figure 2:
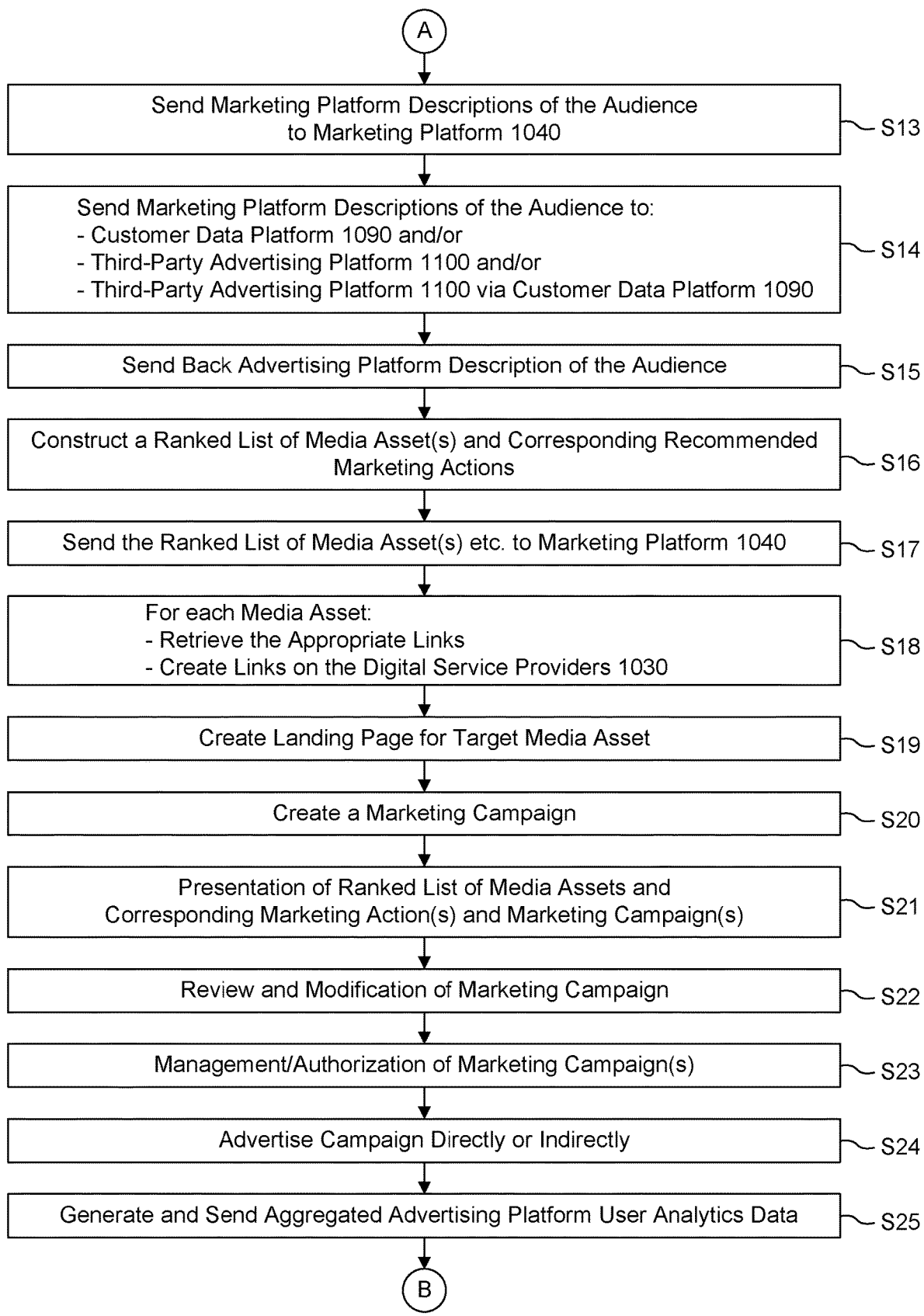
Figure 2:
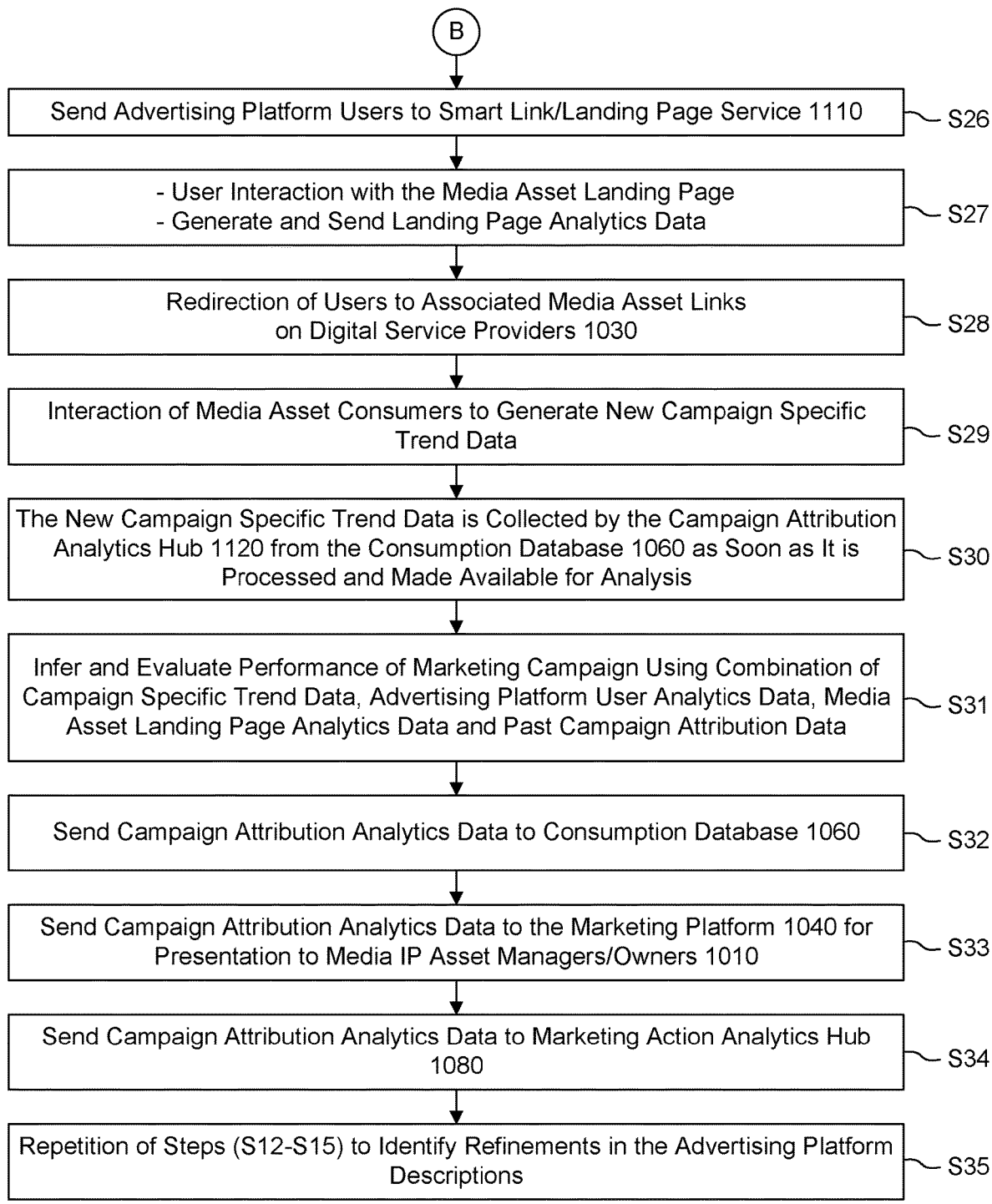

In more detail, FIG. 2 is a flow diagram depicting a plurality of steps executed by the marketing analytics pipeline according to some embodiments of the disclosure. The marketing analytics pipeline 1000 describes the process from the consumption of media assets on DSPs to the detection of marketing opportunities for media assets to the generation of target audiences for the media assets to the presentation of marketing actions to media asset managers 1010 to the delivery of advertisements to the audiences off of streaming platforms to the attribution of the effects of marketing actions in the consumption database 1060 from said marketing actions.

In step S01 of the marketing analytics pipeline 1000, media IP asset managers/owners 1010 send digital media IP assets along with their associated metadata (e.g., audio, video, artwork, etc.) to a digital media asset distributor 1020. In step S02, the media IP assets and their associated metadata are then transformed into appropriate formats for distribution on DSPs 1030. In a specific embodiment of this process, promotional advertisement material, e.g., album art, sample sound clips, etc., are also submitted along with the media IP assets by the media IP asset managers/owners 1010 to the media asset distributor 1020.

In step S03, the media asset distributor 1020 then sends the transformed media assets, metadata and artwork to DSPs 1030 (e.g., Apple Music, Pandora, Spotify, YouTube, etc.), and to a marketing platform 1040. In step S04, DSPs 1030 collect subscription or one-time fees or serve advertisements to consumers in exchange for access to the audio/visual media IP assets sent via a media asset distributor 1020 with the explicitly contracted permission of the owners of said media IP assets 1010. The interaction between the media asset consumers 1050 and the DSPs 1030 is documented and compiled in a transaction-level trend data report.

In step S05, the trend data report is sent from the DSPs 1030 to a consumption database 1060 where it is ingested and processed on a regular cadence typically lagging the actual consumption events by a few days. The media asset distributor 1020 sends the relevant media asset metadata to the consumption database 1060 in step S06. In step S07, the consumption database 1060 uses the media asset metadata to format the trend data reports so that consumption patterns across multiple DSPs 1030 can be analyzed together.

In step S08, an opportunity detection analytics hub 1070 uses the transaction-level trend data reports in the consumption database 1060 to fit statistical model hyperparameters based on the consumption patterns of the entirety of media assets in an offline setting on a regular cadence (e.g., weekly, monthly). The opportunity detection analytics hub 1070 also uses the transaction-level trend data reports in the consumption database 1060 to automatically detect statistically significant changes in the consumption patterns for the entirety of media assets in an online setting (i.e., as soon as the trend data report is processed by the consumption database 1060 and made available for analysis).

In step S09, the opportunity detection analytics hub 1070 uses statistical models to analyze the growth and re-engagement potential for the media assets exhibiting or predicted to exhibit significant changes in their consumption patterns and classifies them as potential marketing opportunities or non-opportunities. Media assets classified as non-opportunities do not proceed further in the marketing analytics pipeline 1000.

The opportunity detection analytics hub 1070 automatically sends those media assets classified as potential marketing opportunities to a marketing action analytics hub 1080 in step S10.

In step S11, the marketing action analytics hub 1080 performs offline model generation which is described below in greater detail later with reference to FIGS. 4B and 7B.

In step S12, the marketing action analytics hub 1080 performs online audience generation which is described below in greater detail later with reference to FIGS. 4A and 7A.

In step S13, the marketing action analytics hub 1080 sends the marketing platform descriptions of the audience for the media asset to the marketing platform 1040, as shown at step S1850 of FIG. 7A, which is discussed in more detail below. In step S14, the marketing platform 1040 then sends the marketing platform descriptions of the audience for the media asset to one or more of the following: a customer data platform 1090 to construct an advertising platform description of the audience for the media asset; a third-party advertising platform 1100 (e.g., Google Ads, Facebook, Instagram) to construct an advertising platform description of the audience for the media asset; or a customer data platform 1090 which transforms the description of the audience for the media asset before sending this transformed description to a third-party advertising platform 1100 to construct an advertising platform description of the audience for the media asset.

In step S15, the advertising platform description of the audience for the media asset is sent back to the marketing platform 1040 and on to the marketing action analytics hub 1080 from either a customer data platform 1090 or a third-party advertising platform 1100.

In step S16, for (possibly multiple) media assets owned by the media IP asset owner 1010, the marketing action analytics hub 1080 uses statistical models, each media asset's high growth potential audience and an advertising platform description of that audience to construct a ranked list of media assets and corresponding recommended marketing actions based on their potential cost and estimated return on investment. Media assets which do not generate corresponding marketing actions or advertising platform descriptions do not proceed further in the marketing analytics pipeline 1000.

In step S17, the marketing action analytics hub 1080 sends the ranked list of media assets and corresponding recommended marketing actions and their advertising platform descriptions of the audiences for the media assets in the list as well as a possible ranked list of auxiliary media assets to the marketing platform 1040.

In step S18, for each media asset in the ranked list of media assets and corresponding recommended marketing actions, the marketing platform 1040 uses application programming interfaces (APIs) of the DSPs 1030 and the associated metadata for the media asset to retrieve the appropriate links for the media asset on the DSPs 1030, and to create links on the DSPs 1030 that (in addition to the target media asset) also include the highly ranked auxiliary media assets from the ranked list of auxiliary media assets (e.g., playlist, radio station) in a specific embodiment of this process. These links are then retrieved from the DSPs 1030 by the marketing platform 1040.

In step S19, for each target media asset in the ranked list of media assets and corresponding recommended marketing actions, the marketing platform 1040 uses APIs of smart link/landing page services 1110 (e.g. Feature.fm, Linkfire) along with the associated metadata for the media asset and the appropriate links on DSPs 1030 to create a landing page for the target media asset.

In step S20, for each target media asset and corresponding marketing action in the ranked list, the marketing platform 1040 uses APIs of the third-party advertising platforms 1100 as well as their associated metadata, landing pages and advertising platform descriptions of the potential growth audience for the media asset to create a marketing campaign. In step S21, the ranked list of media assets and corresponding marketing actions and marketing campaigns is presented by the marketing platform 1040 to the media IP asset managers/owners 1010 in a graphical user interface (GUI) or through an alert notification. The marketing platform 1040 enables media IP asset managers/owners 1010 to review and modify the marketing campaign in step S22.

In step S23, the GUI in the marketing platform 1040 also enables media IP asset managers/owners 1010 to manage funds, set budgets and store promotional advertisement material for marketing campaigns. Media IP asset managers/owners 1010 are also presented with the option to authorize and execute marketing campaigns. If the media IP asset managers/owners 1010 do not execute the marketing campaign, then it does not proceed further in the marketing analytics pipeline 1000. Additionally, media IP asset managers/owners 1010 can also pre-authorize the execution of campaigns exceeding a pre-determined threshold of anticipated cost efficacy.

In step S24, the marketing platform 1040 executes the marketing campaign by either advertising the campaign to users on third-party advertising platforms 1100, or by advertising the campaign directly to users via a customer data platform 1090 in a specific embodiment of this process. In step S25, advertising platform users interact with the marketing campaign which generates aggregated advertising platform user analytics data that is sent either through a third-party advertising platform 1100 or customer data platform 1090 to a campaign attribution analytics hub 1120.

In step S26, the marketing campaign advertisement includes a call-to-action to consume the associated media asset on DSPs 1030 which sends the advertising platform users to the corresponding media asset landing page generated and hosted by the smart link/landing page service 1110. Advertising platform users interact with the media asset landing page which generates landing page analytics data that is sent to the campaign attribution analytics hub 1120 in step S27. In step S28, advertising platform users interact with the media asset landing page and are redirected to the associated media asset links on DSPs 1030. Advertising platform users that are not media asset consumers 1050 of the appropriate DSP 1030 do not proceed further in the marketing analytics pipeline.

In step S29, media asset consumers 1050 interact with media asset links on the corresponding DSPs 1030 which generate new campaign specific trend data that is then processed by the consumption database 1060. The new campaign specific trend data is collected by the campaign attribution analytics hub 1120 from the consumption database 1060 as soon as it is processed and made available for analysis in step S30.

In step S31, the campaign attribution analytics hub 1120 combines the campaign specific trend data, advertising platform analytics data, media asset landing page analytics data and past campaign attribution data to infer and subsequently evaluate the performance of the marketing campaign. The campaign performance evaluation generates campaign attribution analytics data for the marketing campaign. In a specific embodiment of this process the campaign attribution analytics hub 1120 evaluates the performance by attributing how many consumers were reached by the marketing campaign and their rate of engagement with the target assets.

In step S32, the campaign attribution analytics hub 1120 sends the campaign attribution analytics data to the consumption database 1060 to be used to evaluate possible future marketing campaigns. In step S33, the campaign attribution analytics hub 1120 also sends the campaign attribution analytics data to the marketing platform 1040 where the evaluation is presented to the media IP asset managers/owners 1010 in a GUI or through an alert notification.

In step S34, the marketing platform 1040 sends the campaign attribution analytics data to the marketing action analytics hub 1080. In step S35, the campaign attribution analytics data may be used by the marketing action analytics hub 1080 and marketing platform 1040 by repeating steps S12-S15 to inform any necessary refinements in the advertising platform descriptions of the potential growth audience for the media asset which conditional on any changes to the audience description updates the current marketing campaign in the marketing platform 1040.

Opportunity Detection Analytics Hub 1070

Briefly, according to one aspect described herein, the opportunity detection analytics hub 1070 is configured to monitor consumption profiles of media IP assets and automatically detect growth and re-engagement opportunities in an online setting as soon as they occur, including using transaction-level trend data reports from the consumption database 1060 to fit statistical models based on consumption patterns of an entirety of distributed media IP assets in an offline setting on a regular cadence.

Figure 3:
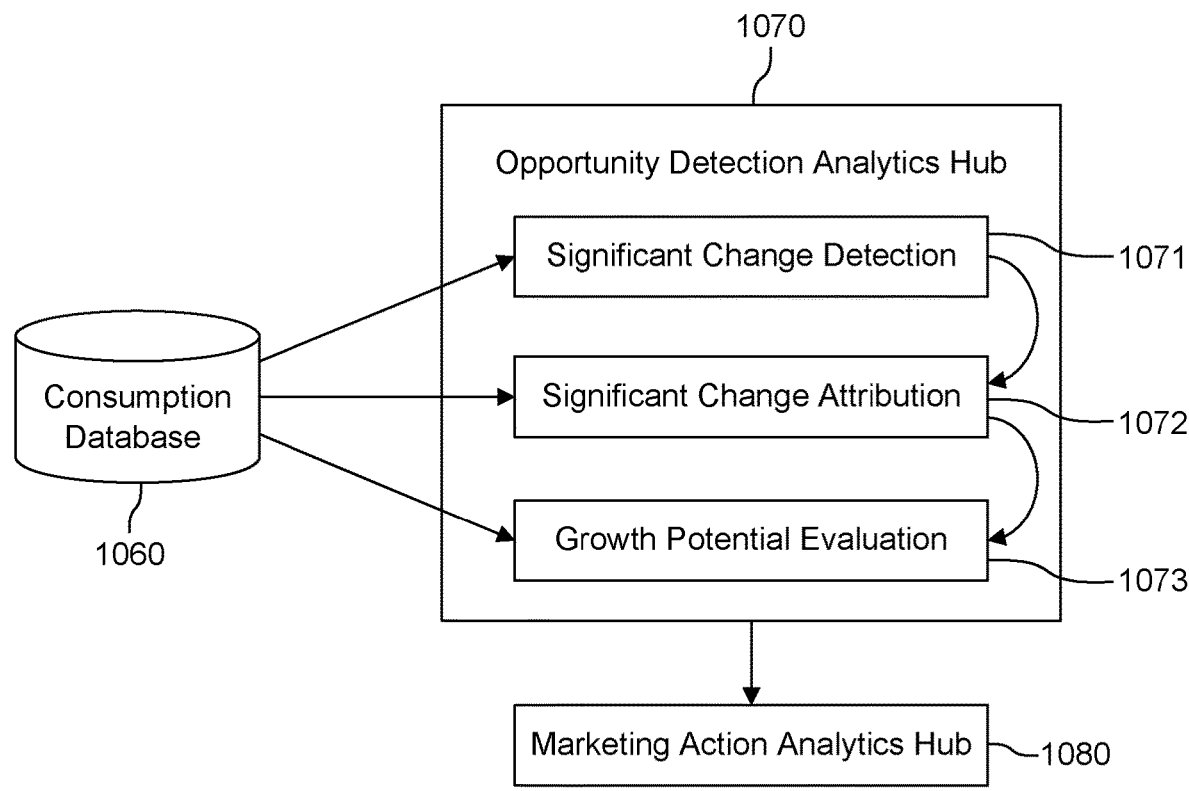
FIG. 3 is a schematic showing additional details of an opportunity detection analytics hub according to some embodiments of the disclosure.

In more detail, FIGS. 3-6 describe some embodiments of the marketing analytics pipeline and process illustrated in FIGS. 1 and 2. FIG. 3 is a schematic showing additional details of the opportunity detection analytics hub 1070 according to some embodiments of the disclosure. In a specific embodiment of the process, the opportunity detection analytics hub 1070 uses statistical models to detect statistically significant shifts in the streaming consumption patterns of a media asset by constantly scanning new consumption data from the consumption database 1060 as it becomes available (significant change detection 1071). Media assets experiencing significant changes in their streaming consumption patterns are then passed on to a sub-module (significant change attribution 1072) for further analysis.

The opportunity detection analytics hub 1070 uses a statistical model along with additional data from the consumption database 1060 to determine the proximal causes of change in streaming consumption (significant change attribution 1072). The opportunity detection analytics hub 1070 (growth potential evaluation 1073) uses a statistical model applied to additional data from the consumption database 1060 according to the proximal drivers of change identified by (significant change attribution 1072) to evaluate the potential marketing opportunity of the media asset. Media assets classified as opportunities are passed along to the marketing action analytics hub 1080.

In a specific embodiment of the system and process schematically illustrated in FIG. 3, significant change detection 1071 monitors media assets in the form of sound recordings, lyrics/album art videos, and/or music videos and scans for significant changes in their streaming consumption patterns (i.e. significant changes in their daily stream count time series). The total stream count is computed daily for all distributed DSPs for sound (e.g., Spotify, Apple Music, Pandora, Amazon, etc.) and video recordings (e.g., YouTube, Vevo, etc.).

Significant changes in consumption patterns are called regions of significant change and are detected according to a model of daily stream counts. In general, the model of daily stream counts is characterized by its ability to accurately and efficiently detect regions of significant change as soon as they occur. This is achieved through a model that is both trained and run online on each media asset individually across all DSPs and engagement contexts. The model learns the consumption patterns of media assets by accommodating for the strong day of week effect present in streaming media consumer behavior and adapting to the underlying distribution so that when statistically significant deviations from typical consumption patterns occur, they are detected as soon as the data is available. Additionally, the model is characterized by its ability to provide confidence intervals for the most probable future consumption patterns of media assets based on their past consumption patterns rather than simple point estimates. The model explicitly estimates the growth rate and it uses this estimate to identify regions of significant change. Since only the hyperparameters are trained on global consumption patterns, training on the consumption patterns of each individual media asset does not depend on global consumption patterns, which enables the model to be parallelized for efficient computation. This model detects both gradual and rapid changes in consumption.

In the embodiment described herein, the modeling of daily stream counts proceeds by modeling daily stream counts y as noisy measurements of a latent multivariate state vector z consisting of level l, trend b, and periodic offset s components $s_t$ which model day of week variances in stream counts at time t. The latent state propagates forward in time via a linear Markov process, i.e., $z_t = A_t z_{t-1} + \varepsilon_t \varepsilon_t$, while its connection to new data is modeled as $y_t = B_t z_t + \eta_t$. Here, t and t−1 refer to current and prior states, respectively, $A_t$ is a state transition matrix that propagates vector z forward in time from t−1 to t, $B_t$ is a matrix that connects new data y to vector z at time t, $\varepsilon_t$ is a vector of scaling parameters at time t, and $\in_t$ and $\eta_t$ are univariate Gaussian noise terms at time t. The full posterior distribution of the state is propagated forward in time by employing a dynamic Bayesian network, which recursively updates the state distribution with each new data point as $$p(z_t|y_{0:t}) \propto p(y_t|z_t) \int p(z_t|z_{t-1}) p(z_{t-1}|y_{0:t-1}) dz_{t-1}$$

wherein each p( ) represents a probability function of an event occurring. Future state distributions in the absence of new data are then predicted by computing $$p(z_{t+T}|y_{0:t}) = \int p(z_{t+T}|z_{t+T-1}) p(z_{t+T-1}|z_{t+T-2}) \ldots p(z_t|y_{0:t}) dz_{t+T-1} dz_{t+T-2} \ldots dz_t$$

In this specific embodiment, rapid changes in consumption (changes occurring on the same time scale that the data is sampled) are detected by recursively calculating the probability that the current state distribution is equivalent to the predicted one based on previous data. Moreover, explicitly modeling the posterior distribution of the trend b enables the detection of gradual significant changes by recursively calculating the probability that b significantly deviates from zero.

Once a statistically significant change in the total stream count has been detected, significant change attribution 1072 is then used to determine the proximal cause(s) of the region of significant change.

Additional engagement metrics in the trend reporting are used to determine the proximal causes of a region of significant change. Daily stream counts are separated into their individual retailer daily stream counts as well as further separated into streaming context (where the trend data is available for a DSP). For a sound recording the streaming context is separated into two main categories: active streams (e.g. streams from active search or collection) and passive streams (e.g. streams from editorial or algorithmic playlists or radio). Additionally, passive streams are further separated into the specific playlists and radio stations constituting the overall passive streams. Significant change attribution 1072 uses these engagement metrics to inform a probabilistic model to attribute the on-platform causes of the region of significant change. For regions of significant change attributed to active streams, additional information (e.g., news articles, social media activity) may be required to attribute the off-platform activity causing the region of significant change.

Media assets exhibiting significant changes in their streaming consumption patterns are then sent to growth potential evaluation 1073 to be classified as either potential marketing opportunities with associated marketing campaign goals or non-opportunities using a statistical model applied to additional engagement metrics in the trend reporting. Key engagement metrics used in this model include the passive to active conversion rate, the search conversion rate, and the engagement drop off rate. The passive to active conversion rate determines the proportion of media asset consumers in a given time window that streamed a sound recording in a passive context and then went on to stream again in an active context. The search conversion rate determines the proportion of media asset consumers in a given time window that streamed a sound recording for the first time from active search and then streamed actively again from their collection. The engagement drop off rate determines the rate at which engaged consumers stop engaging with the media asset. In a specific embodiment each of these key engagement metrics are estimated from aggregated population data.

The opportunity detection analytics hub 1070 passes the media assets classified as opportunities and their associated marketing campaign goals along to the marketing action analytics hub 1080.

Marketing Action Analytics Hub 1080

Briefly, according to one aspect described herein, the marketing action analytics hub 1080 is configured to receive marketing campaign goals for specific media IP assets from an opportunity detection analytics hub 1070 within a marketing analytics pipeline or directly from media IP asset managers/owners 1010 through the marketing platform 1040.

The Marketing Action Analytics Hub 1080 includes an offline model generation component 1820 and an online audience generation component 1850, and these are discussed in turn below.

Offline Model Generation Component 1820

Figure 4A:
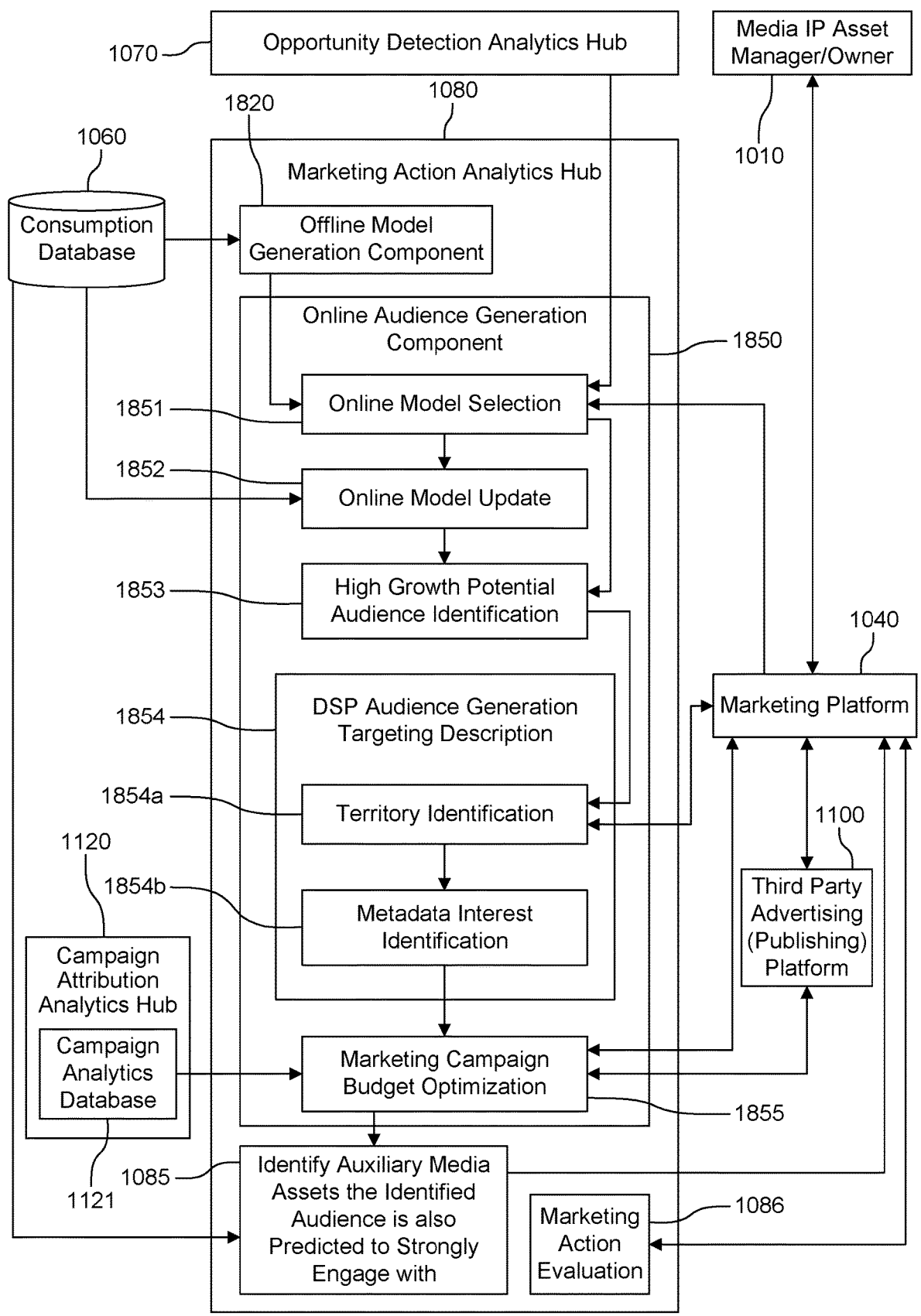
FIG. 4A is a schematic showing an online audience generation component of a marketing action analytics hub according to some embodiments of the disclosure.
Figure 4B:
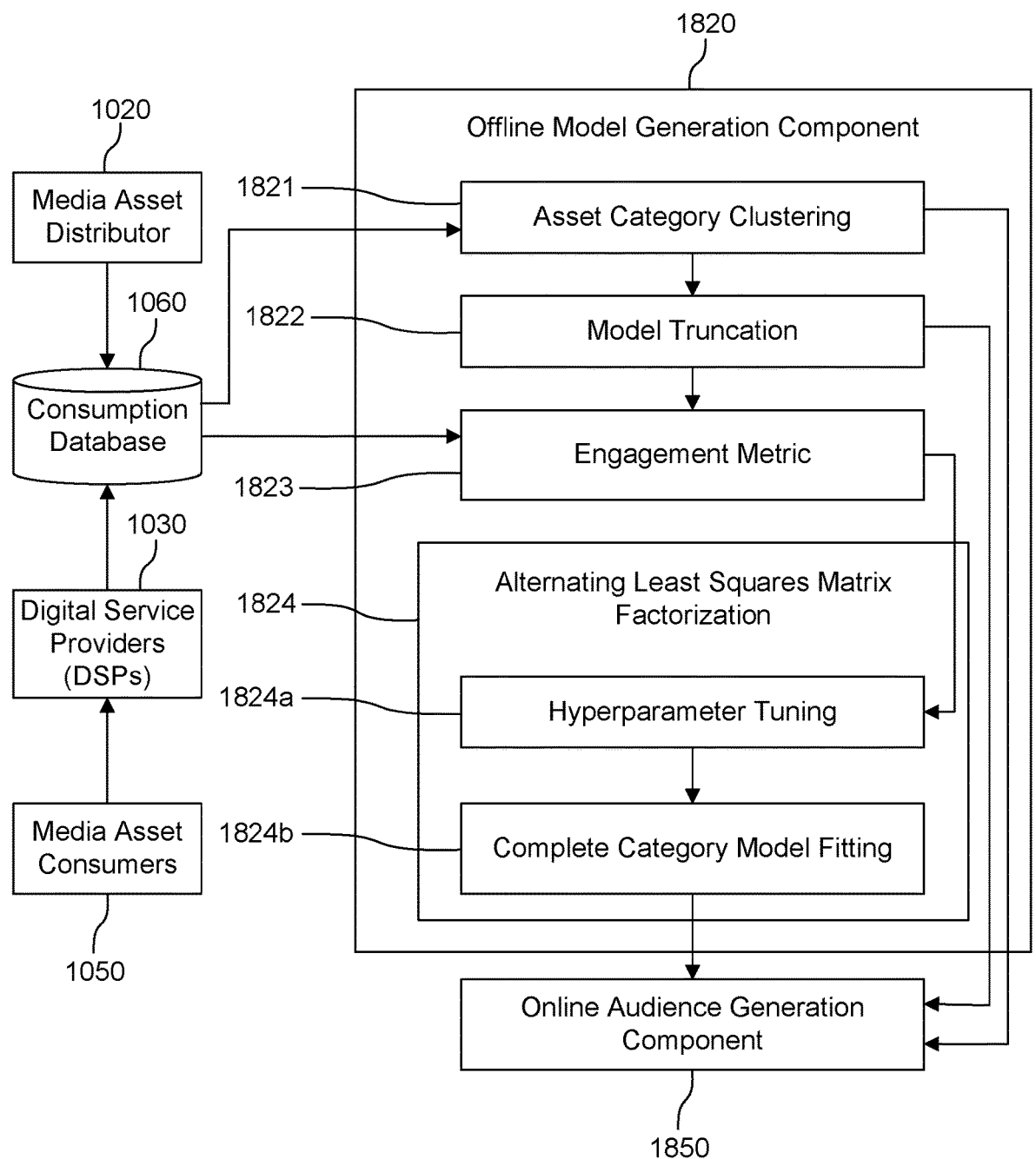
FIG. 4B is a schematic showing an offline model generation component of a marketing action analytics hub according to some embodiments of the disclosure.

FIG. 4B depicts one example of an offline model generation component 1820 and its interaction with other components of the marketing analytics pipeline. Briefly, according to one aspect described herein, to generate an offline model, the offline model generation component 1820 receives transaction-level trend data reports on media IP assets from a consumption database 1060 on a regular cadence, and clusters media IP assets into a finite set of categories. The categories are sent to the online audience generation component 1850 of the marketing action analytics hub 1080, which is described later in connection with FIGS. 4A and 7A. Statistical models are trained, specifically statistical models of geodemographic media IP asset engagement, on a regular cadence for each category. Training of the statistical models includes: the establishment of thresholds for DSP consumption reporting data; the construction of a consumption tensor reflecting per-channel consumption of each media IP asset from each geodemographic group; the transformation of the consumption tensor to an engagement matrix using engagement metrics; the training and fit of each category-specific model using a matrix factorization algorithm on the engagement matrix as approximated using hyperparameters so as to minimize a cost function; and the refinement and tuning of the hyperparameters followed by a repeat of the train-and-fit step as necessary.

Figure 7A:
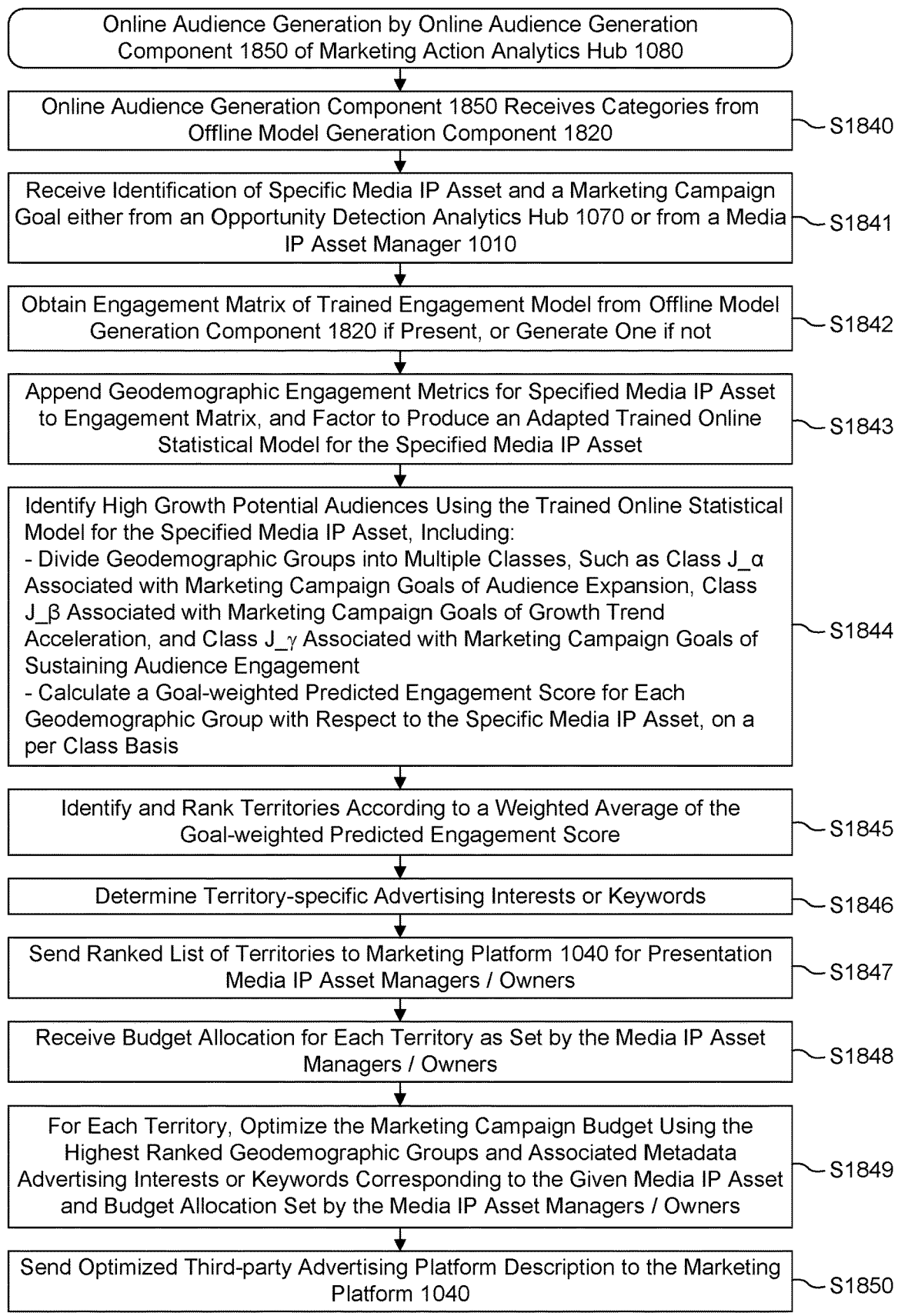
FIG. 7A is a flow diagram depicting a plurality of steps executed by the online audience generation component according to some embodiments of the disclosure.
Figure 7B:
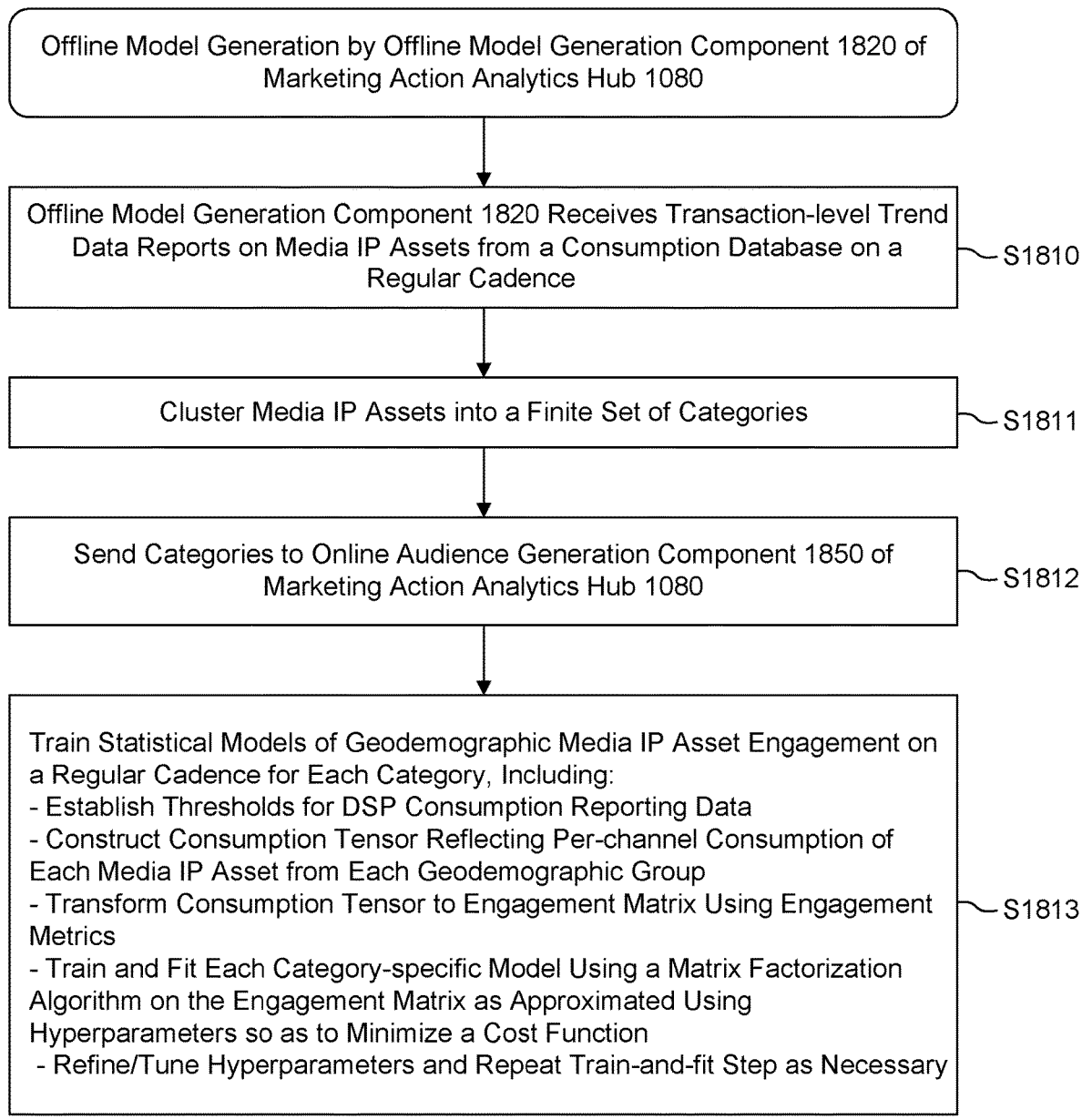
FIG. 7B is a flow diagram depicting a plurality of steps executed by the offline model generation component according to some embodiments of the disclosure.

In more detail FIG. 7B is a flow diagram depicting offline model generation by the offline model generation component 1820, which is depicted in FIG. 4B.

Associated with each media IP asset are metadata supplied to the media asset distributor 1020 by the media IP asset managers/owners 1010. As shown at step S1810, on a regular cadence (e.g. weekly, monthly) all media IP assets M in the consumption database 1060 are sent to the offline model generation component 1820 where they are clustered (at step S1811) into a finite set of (possibly overlapping) categories C in the asset category clustering component 1821, using a combination of statistical clustering methods based on aggregate geodemographic engagement, genre metadata, and other available data e.g. DSP public playlists and terrestrial radio co-occurrence. Additionally, since new media IP assets are continually sent to the media asset distributor, new media IP assets must be assigned categories using only metadata available before associated trend reporting is received from the DSPs. These media IP asset category assignments are sent to the online audience generation component 1850 (at step S1812).

At step S1813, statistical models of geodemographic media IP asset engagement are trained offline on a regular cadence (e.g. daily, weekly) for each category described above in the offline model generation component 1820. To accommodate size and speed constraints on the generation of target audiences in the online audience generation component 1850, only the DSP consumption reporting data from a select subset of media IP assets and geodemographic groups are used as input in training the category specific models of geodemographic media IP asset engagement. Media IP assets in the consumption database 1060 that do not pass consumption volume thresholds for geodemographic groups are not utilized in the training of the model where the consumption volume thresholds are set on a regular cadence and are informed by the number of media IP assets in a given category.

As seen in step S1813, training of the statistical models includes the establishment of thresholds for DSP consumption reporting data. Specifically, for each given category of media IP assets $c \in C$ of size M, let G be the set of (possibly consolidated) geodemographic groups of size N reported by the DSPs to have had any consumption of any of the media IP assets in c, and let $C_{ij}$ denote the (i, j)-entry of the M×N matrix C corresponding to the number of streaming events of the i-th media IP asset by the j-th geodemographic group. This consumption matrix C, generated by the asset category clustering component 1821 is then passed along to and further processed in the model truncation component 1822 as follows. Sort rows of C according to its row sums in decreasing order and similarly sort columns of C according to its column sums in decreasing order. Let I be the top m rows and J be the top n columns of the permuted matrix with m and n chosen so that: (1) the sum of all entries of the m×N submatrix of C indexed by I is more than a threshold proportion $\tau_1$ of $|C|_1 := \Sigma_{i,j} C_{ij}$, the sum of all entries of the complete M×N matrix C, (2) the sum of all entries of the M×n submatrix of C indexed by J is more than a threshold proportion $\tau_2$ of $|C|_1$, (3) the m×n submatrix of C indexed by I and J is more than a threshold proportion $\tau_3$ of $|C|_1$, (4) the sparsity, i.e. the proportion of zero entries of the submatrix, is less than $\tau_4$, and (5) the product m·n is less than $\tau_5$, where $\tau_5$ is chosen to ensure that the analysis will work within the computational resource constraints of the particular implementation. The media IP assets associated with I and the geodemographic groups associated with J are then passed on to the engagement metric component 1823 where they will be used in further category specific analyses. The consumption threshold criteria (1, 2, 3) above ensure that a sufficient volume of the total consumption of the media IP asset category is included in the subsequent model, while the sparsity requirement (4) ensures that geodemographic groups and media IP assets with low consumption volumes, which might otherwise introduce noise into subsequent measures of engagement, are excluded from the analysis and the size requirement above (5) ensures that the analysis will be practically executable on the computational resources available. In the case where it is not possible to satisfy all the constraints, the smallest possible subset that satisfies all (1, 2, 3) or the largest possible subset that satisfies at least one of (4) or (5) is chosen.

Additionally, in the model truncation component 1822 for each given category, a geodemographic weight $\omega_j$ is computed for each geodemographic group $j \in J$ as a function of the consumption of all media IP assets $i \in I$ by that geodemographic group, and also geodemographic specific measures of population size, e.g. from publicly available census data, and DSP subscription rates, e.g. from shareholder reports. As an example, in a particular embodiment these weights are computed as $\omega_j := \Sigma_{i \in I} C_{ij}$. These geodemographic weights are then passed to the online audience generation component 1850 and the engagement metric component 1823.

As further seen in step S1813, training of the statistical models includes the construction of a consumption tensor reflecting per-channel consumption of each media IP asset from each geodemographic group. Specifically, for each given category $c \in C$, let $V_{ij}$ denote the (i, j)-th vector of the m×n×t tensor V with each element of $V_{ij}$ corresponding to the number of streaming events within each oft distinct consumption channels indexed by h, of the i-th media IP asset from the set I by the j-th geodemographic group from the set J. Here consumption channels are all reported combinations of device types (e.g. mobile, PC, gaming console, etc.), operating systems (Android, iOS, Linux, etc.), streaming contexts within the DSP clients (e.g. chart, collection, radio station, etc.), and time windows within the analysis period (e.g. weekly or daily aggregates). For example, one of several thousand channels receives consumption volume from mobile phones with iOS operating systems from user collections last week while another channel receives consumption from a DSP web-client on a PC from DSP charts two weeks ago. Then let $V_{ijh}$ be the consumption in channel h of the i-th media IP asset from the j-th geodemographic group. The engagement metric component 1823 uses the indices I and J from the model truncation component 1822 to obtain the relevant data from the consumption database 1060 which is then used to construct the tensor V.

As further seen in step S1813, training of the statistical models includes the transformation of the consumption tensor to an engagement matrix using engagement metrics. While latent factor analyses are directly possible for tensors such as V, the specific embodiment disclosed herein uses a computationally streamlined approach of first mapping these consumption vectors $V_{ij}$ to a scalar metric of engagement, i.e. $f(V_{ij}, \omega_j) = E_{ij}$, which defines an engagement matrix E. As an example of an engagement metric in a particular embodiment, let A be a set of channels corresponding to consumption primarily initiated by intentional choices of DSP media asset consumers as contrasted with consumption primarily driven by DSP editorial teams, recommendation algorithms and third-party curators and tastemakers. Then let $$E_{ij} := \frac{(A_{ij})^2}{A_{ij} + P_{ij}}$$

be the scalar engagement metric in this example where $A_{ij} := \Sigma_h 1_A(h) \cdot V_{ijh}$ and $P_{ij} := \Sigma_h (1 - 1_A(h)) \cdot V_{ijh}$ are the active and passive consumption respectively for the i-th media IP asset from the j-th geodemographic group. The process and method described herein permits the use of many such scalar engagement metrics and one familiar with the art will be able to generalize from this example. After the consumption tensor V has been transformed into an engagement matrix E, this engagement matrix is passed on to the ALS matrix factorization component 1824.

TABLE 2

Example of a matrix of geodemographic group-media IP asset engagements

| [Engagement Metric] | Males aged 18-24 in New York NY, US using premium Spotify | Females aged 25-34 in Ireland using ad-supported YouTube | Females aged 25-34, in Para, Brazil using ad-supported Deezer | ... |
|---|---|---|---|---|
| Song A by Artist 1 | −4 | −5 | 3 | ... |
| Song B by Artist 2 | 3 | −8 | 2 | ... |
| Song C by Artist 2 | −1 | 9 | 8 | ... |
| Song D by Artist 3 | −3 | 1 | −7 | ... |
| Song E by Artist 4 | 4 | 2 | 1 | ... |
| ... | ... | ... | ... | ... |

As further seen in step S1813, training of the statistical models includes the training and fit of each category-specific model using a matrix factorization algorithm on the engagement matrix as approximated using hyperparameters so as to minimize a cost function. Specifically, in the ALS matrix factorization component 1824 the statistical models for each category described above are trained and fit using a matrix factorization algorithm. The matrix factorization model approximates a matrix by a product of two latent factor matrices $E \approx E_{est} = XY^\tau$ where X is an m×k matrix, Y is an n×k matrix, and k≤min(m, n). The m·n entries of E are split into a training set $S_{train}$ and a test set $S_{test}$ of indices, and an alternating least squares (ALS) framework is used to factorize the matrix E by minimizing the cost function

TABLE 1

Example of a tensor of geodemographic group-media IP asset consumption volume by channel

| | | Context/Channel | | | |
|---|---|---|---|---|---|
| [Stream Events] | | Mobile - Android - radio - previous week | Mobile - iOS - collection - 2 weeks previous | PC - Windows - chart - previous week | ... |
| Media IP Asset | Geodemographic Group | | | | |
| Artist 1 - Song A | Males aged 18-24 in New York NY, US using premium Spotify | 436 | 274 | 185 | ... |
| | Females aged 25-34 in Ireland using ad-supported YouTube | 225 | 588 | 215 | ... |
| | Females aged 25-34, Para, BR using ad supported Deezer | 930 | 977 | 343 | ... |
| | ... | ... | ... | ... | ... |
| Artist 2 - Song B | Males aged 18-24 in New York NY, US using premium Spotify | 1093 | 1002 | 285 | ... |
| | Females aged 25-34 in Ireland using ad-supported YouTube | 1079 | 908 | 404 | ... |
| | Females aged 25-34, Para, BR using ad-supported Deezer | 448 | | 118 | ... |
| | ... | ... | ... | ... | ... |
| Artist 2- Song C | Males aged 18-24 in New York NY, US using premium Spotify | 1041 | 1007 | 262 | ... |
| | Females aged 25-34 in Ireland using ad-supported YouTube | 588 | 910 | 209 | ... |
| | Females aged 25-34, Para, BR using ad-supported Deezer | 844 | 774 | 243 | ... |
| | ... | ... | ... | ... | ... |
| ... | ... | ... | ... | ... | ... |

$$\text{cost}(X, Y) := \sum_{(i,j) \in S_{train}} (E_{ij} - X_i Y_j^T)^2 + \lambda \left( \sum_{i \in I} \|X_i\|^2 + \sum_{j \in J} \|Y_j\|^2 \right)$$

where $X_i$ and $Y_j$ respectively denote the i-th and j-th rows of the matrices X and Y, $\lambda$ is a regularization parameter, and $\|\cdot\|$ denotes the $l^2$ norm. The analytic expressions that minimize the cost function for $X_i$ and $Y_j$ for a fixed Y and a fixed X respectively are $$X_i = (ED^{(i)} Y((Y^\tau D^{(i)} Y + \lambda \cdot Id)^{-1})^\tau)_i$$

and $$Y_j = (E^\tau D^{(j)} X((X^\tau D^{(j)} X + \lambda \cdot Id)^{-1})^\tau)_j$$

where $D^{(i)}$ is an n×n diagonal matrix with the j-th diagonal element one if $(i, j) \in S_{train}$ and zero otherwise, and similarly for the m×m matrix $D^{(j)}$ and Id is the appropriately sized identity matrix. As is typical of an ALS framework the above equations for $X_i$ and $Y_j$ are applied iteratively to update an approximation which converges to a unique solution of the cost function cost(X, Y).

TABLES 3 & 4

Example of factors of the engagement matrix

| [Media IP Asset Tastes] | Latent Factor 1 | Latent Factor 2 | ... |
|---|---|---|---|
| Song A by Artist 1 | 1 | −1 | ... |
| Song B by Artist 2 | 2 | −2 | ... |
| Song C by Artist 2 | −3 | −1 | ... |
| Song D by Artist 3 | 1 | 2 | ... |
| Song E by Artist 4 | −1 | 0 | ... |
| ... | ... | ... | ... |

X

| [Geodemographic Tastes] | M 18-24, New York NY, US Prem-Spotify | F 25-34, IE, Ad-YT | FM 18-34, Para, BR Ad-Deezer | ... |
|---|---|---|---|---|
| Latent Factor 1 | 0 | −3 | −2 | ... |
| Latent Factor 2 | −1 | 1 | −3 | ... |
| ... | ... | ... | ... | ... |

TABLE 5

Latent factor approximation of the engagement matrix

| (Estimated Engagements) | M 18-24, New York NY, US | F 25-34, IE | FM 18-34, Para, BR | ... |
|---|---|---|---|---|
| Song A by Artist 1 | 1 | −4 | 2 | ... |
| Song B by Artist 2 | 1 | −8 | 2 | ... |
| Song C by Artist 2 | 0 | 9 | 8 | ... |
| Song D by Artist 3 | −2 | 1 | −7 | ... |
| Song E by Artist 4 | 0 | 2 | 2 | ... |
| ... | ... | ... | ... | ... |

A computational bottleneck to minimizing the cost function is computing the $Y^T D^{(i)} Y$ and $X^T D^{(j)} X$ terms and their respective inverse matrices for every row in each alternating iteration, which has time complexity $O(mnk^2)$. To alleviate this bottleneck, the following approximation is utilized instead when iteratively updating X and Y, $$X_i = (ED^{(i)} Y((Y^\tau Y + \lambda \cdot Id)^{-1})^\tau)_i$$

and $$Y_j = (E^\tau D^{(j)} X((X^T X + \lambda \cdot Id)^{-1})^\tau)_j,$$

as this reduces the time complexity to O(mnk). The speedup afforded by this approximation is critical to the computational efficiency of this process, as the quality of the recommendation provided by the model is dependent on the hyperparameter selection of the factorization model, i.e. k and $\lambda$ representing the number of latent factors of the model and the strength of regularization respectively. An additional advantage of this approach is that it is readily adapted to manage missing data robustly.

As further seen in step S1813, training of the statistical models includes the refinement and tuning of the hyperparameters followed by a repeat of the train-and-fit step as necessary. More specifically, in the hyperparameter tuning subcomponent 1824a of the ALS matrix factorization component 1824 the hyperparameters are chosen using a standard cross validation scheme, again for each of the specific categories of media IP assets being analyzed independently. Specifically, the values of k and $\lambda$ are determined by minimizing the sum of squared errors SSE(k, $\lambda$):=$\Sigma_{(i,j) \in S_{test}} (E_{i,j}^{(k,\lambda)} - E_{i,j})^2$ using an adaptive grid search where $E_{i,j}^{(k,\lambda)}$ is the (i, j)-entry in the matrix $E_{est}^{(k,\lambda)}$ denoting the estimate obtained from the adapted ALS procedure described above for a given hyperparameter pair (k, $\lambda$). Once this hyperparameter pair is selected the model is then trained again to minimize the cost function on the combined train and test dataset using the chosen k and $\lambda$ to fit $E_{est} = XY^\tau$, in the complete category model fitting subcomponent 1824b, the complete fitted model is then sent to the online audience generation component.

Online Audience Generation Component 1850

FIG. 4A depicts one example of the online audience generation component 1850 and its interaction with other components of the marketing analytics pipeline 1000. Briefly, according to one aspect described herein, for online generation of an audience, the online audience generation component 1850 receives categories from the offline model generation component 1820, and receives identification of specific media IP asset(s) and marketing campaign goal(s) either from the opportunity detection analytics hub 1070 or from a media IP asset manager 1010. An engagement matrix of a trained engagement model is obtained from the offline model generation component 1820 if present, or one is generated if not. Geodemographic engagement metrics for specified media IP asset(s) are appended to the engagement matrix, which is factored to produce an adapted trained online statistical model for the specified media IP asset(s). High growth potential audiences are identified using the trained online statistical model for the specified media IP asset(s). Identification of high growth potential audiences includes: dividing geodemographic groups into multiple classes, such as class $J_\alpha$ associated with marketing campaign goals of growth through audience expansion, class $J_\beta$ associated with marketing campaign goals of growth trend acceleration, and class $J_\gamma$ associated with marketing campaign goals of sustaining audience engagement i.e. re-engagement; and calculating a goal-weighted predicted engagement score for each geodemographic group with respect to the specific media IP asset, on a per class basis. Territories are identified and ranked according to a weighted average of the goal-weighted predicted engagement score, and territory-specific advertising interests or keywords are determined. The ranked list of territories is sent to the marketing platform 1040 for presentation to the media IP asset managers/owners 1010. A budget allocation for each territory, as set by the media IP asset managers/owners 1010, is received and for each territory, the marketing campaign budget is optimized using the highest ranked geodemographic groups and associated metadata advertising interests or keywords corresponding to the given media IP asset and budget allocation set by the media IP asset managers/owners 1010. The optimized third-party advertising platform description is then sent to the marketing platform 1040.

In more detail FIG. 7A is a flow diagram depicting online audience generation by the online audience generation component 1850, which is depicted in FIG. 4A.

The online audience generation component 1850 contains a model selection component 1851 which selects and receives the category specific model from the offline model generation component 1820 (step S1840). The model selection component 1851 consists of a category specific aggregated geodemographic group consumption database, derived from the consumption database 1060 using the media IP asset and geodemographic group indices associated with the matrix C from the asset category clustering component 1821, and the relevant metadata of the media IP assets and the category specific geodemographic weights from the model truncation component 1822, along with the trained model $E_{est}=XY^\tau$ and input data E indexed by the sets I and J from the complete category model fitting subcomponent 1824$b$.

When a media IP asset $i_0$ and a marketing campaign goal are received from either the opportunity detection analytics hub 1070 or directly from a media IP asset manager 1010 via the marketing platform 1040 (step S1841), the online model selection component 1851 passes the marketing campaign goal along to the high growth potential audience identification component 1853 and also performs a dictionary look-up to check if the submitted media IP asset is present in the appropriate statistical model determined by the asset category clustering component 1821, i.e. whether or not $i_0 \in I$ for the appropriate category of media IP assets given its category assignment (step S1842). If $i_0 \in I$ then all relevant geodemographic group engagement information is already implicitly present in the trained, category specific model. If $i_0 \notin I$ additional steps, described in the next paragraph, must be taken. In a specific embodiment marketing campaign goals can emphasize a combination of three broad growth and re-engagement strategies: accelerating recent growth trends; expanding to new audiences for greater breadth; sustaining engagement with existing core audiences).

When $i_0 \notin I$ the online model selection component 1851 first sends the media IP asset to the online model update component 1852 which then sends a request to the consumption database 1060 to receive consumption for the geodemographic groups J used in the appropriate statistical model determined by the category associated with the media IP asset based on its cluster assignment in the asset category clustering component 1821, i.e. $V_{i_0 j}$ for all $j \in J$ from which the engagement metrics $E_{i_0 j}$ are determined as in the engagement metric component 1823.

Next, in step S1843, geodemographic engagement metrics for specified media IP asset(s) are appended to the engagement matrix, which is factored to produce an adapted trained online statistical model for the specified media IP asset(s). Specifically, the row vector $E_{i_0}$ corresponding to the geodemographic engagement metrics for $i_0$ is appended to the matrix $E_{est}$ to obtain a new (m+1)×n engagement matrix $E_{est}^*$. To obtain new factor matrices the matrices X and Y are updated by first replacing E with $E_{est}^*$ to generate an (m+1)×k matrix $\hat{X}$ and then replacing X with this new matrix along with $E_{est}^*$ to generate the n×k matrix $\hat{Y}$. This produces a new (m+1)×n factorization $\hat{X}\hat{Y}^\tau$ which is then used as the adapted trained online statistical model for the media IP asset $i_0$.

In step S1844, high growth potential audiences are identified using the trained online statistical model for the specified media IP asset. Specifically, the online model selection component 1851 or online model update component 1852 sends the appropriate trained online statistical model to the high growth potential audience identification component 1853, i.e. $E_{est}=XY^\tau$ in the case $i_0 \in I$ and $E_{est}=\hat{X}\hat{Y}^\tau$ when $i_0 \notin I$ where for notational convenience we denote the matrix $E_{est}$ by $\hat{E}$, and similarly we use X and Y to denote the factors of E hereafter. The latent factors of the model (or adapted model) are then used to make predictions for the engagement metrics for each geodemographic group in J.

In the conventional collaborative filtering context, the latent factors derived from a matrix factorization approach are used to derive predictions of individual preference for items that users have not engaged with yet. In contrast, in the process described herein and as a result of the sparsity constraints of the model truncation component 1822, there is observed engagement between most media IP assets and geodemographic groups which supports a different approach to the derivation of recommendations.

Specifically, as further seen in step S1844, training of the statistical models includes dividing geodemographic groups into multiple classes, such as class $J_\alpha$ associated with marketing campaign goals of audience expansion, class $J_\beta$ associated with marketing campaign goals of growth trend acceleration, and class $J_\gamma$ associated with marketing campaign goals of sustaining audience engagement. For each $j \in J$, define $\Delta(i_0, j):=\hat{E}_{i_0 j}-E_{i_0 j}$ and let $\mu_{i_0}$ and $\sigma_{i_0}$ denote the sample mean and standard deviation of $\{\Delta(i_0,j)|j \in J\}$ respectively. Then, in the high growth potential audience identification component 1853 for the media IP asset $i_0$ geodemographic groups are divided into three classes, class $J_\alpha$ consisting of geodemographic groups j such that $\Delta(i_0, j) \gg \mu_{i_0}+\sigma_{i_0}$ where class $J_\alpha$ is associated with marketing campaign goals of audience expansion, class $J_\beta$ consisting of geodemographic groups j such that $\Delta(i_0, j) \ll \mu_{i_0}-\sigma_{i_0}$ where class $J_\beta$ is associated with marketing campaign goals of growth trend acceleration, and lastly class $J_\gamma$ consisting of geodemographic groups j such that $\mu_{i_0}-\sigma_{i_0} \ll \Delta(i_0, j) \ll \mu_{i_0}+\sigma_{i_0}$ where class $J_\gamma$ is associated with marketing campaign goals of sustaining audience engagement.

Then, as further seen in step S1844, training of the statistical models includes calculating a goal-weighted predicted engagement score for each geodemographic group with respect to the specific media IP asset, on a per class basis. Specifically, using these class assignments a goal-weighted predicted engagement score $\hat{E}_{i_0 j}^*$ is calculated for each geodemographic group with respect to $t_{i_0}$. In a particular embodiment this is calculated as $\hat{E}_{i_0 j}^*:=(1+\rho \cdot 1_{j \in \Lambda}) \cdot \max(\hat{E}_{i_0 j}, E_{i_0 j})$ where $\Lambda$ encodes the marketing campaign goal, i.e. $\Lambda=J_\alpha$ if the marketing campaign goal is expansion, $\Lambda=J_\beta$ if the campaign goal is acceleration and $\Lambda=J_\gamma$ if the marketing campaign goal is sustaining engagement, $\rho$ is a number between zero and one parameterizing how strongly alignment with the specified goal is prioritized. The validity of associating these different geodemographic groups with different marketing objectives is dependent on the effective clustering of the media IP assets and the model hyperparameter selection. The goal-weighted predicted engagement scores $\hat{E}_{i_0 j}^*$ are then sent to the territory identification subcomponent 1854$a$ of the DSP audience generation targeting description component 1854.

Within the context of marketing campaigns for media IP assets on third-party advertising platforms, from the execution of a wide variety of marketing campaigns on behalf of the media IP asset managers/owners by the media asset distributor across genres, territory and dates, territory has emerged as a consistent and strong factor driving cost differences between campaigns. That is, while the precise cost to reach an individual user on third-party advertising platforms varies with respect to the internal ad-bidding algorithms, the variation within a single campaign across territory is consistently greater than the variation between geodemographic groups within these territories. Similarly, variation in DSP revenue per stream is strongly driven by territory.

Additionally, regardless of the overall marketing campaign optimization criteria provided to the third-party advertising platform (e.g. impressions, clicks, conversions, etc.), the internal bidding optimization algorithms of third-party advertising platforms will prioritize serving advertisements to users at the lowest possible cost to the advertiser. If marketing campaigns are not separated along territorial boundaries, then this has the effect of the bidding optimization algorithms preferentially allocating marketing campaign budget to the most cost-effective territories. This allocation may not be consistent with overall advertising strategy and specific marketing campaign objectives (e.g. if the marketing campaign objective is to grow the audience of a media IP asset in several new territories at once). Similarly, this allocation may not be the most effective with respect to ROI since the more cost-effective advertising territories may correspond to the territories where DSP revenue per stream is lower. This, along with differences in language between territories results in the minimal requirement that marketing campaigns be separated along territorial boundaries for the effective allocation of marketing budget within a campaign. In other embodiments this separation may be further refined along other geodemographic boundaries (e.g. age, gender).

Step S1845 identifies and ranks territories according to a weighted average of the goal-weighted predicted engagement score. Specifically, in the territory identification subcomponent 1854a let $J_T$ be the subset of geodemographic groups in J associated with a given territory T. Geodemographic groups in $J_T$ are ranked according to $\hat{E}_{i,j}^*$, with high growth potential geodemographic groups denoted by $J_T^*$. Territories are then ranked according to a weighted average of the goal-weighted predicted engagement score $\hat{E}_{i_0 j}^*$ over the geodemographic groups in $J_T^*$, using the geodemographic weights provided by the model truncation component 1822 of the offline model generation component 1820. The top ranked territories according to this weighted average, along with the subset of high growth potential geodemographic groups particular to each of these territories $J_T^*$ are then sent to the metadata interest identification subcomponent 1854b.

As an example, in a particular embodiment leg $J_T^* \subseteq J_T$ be the top geodemographic groups of $J_T$ sorted by $\hat{E}_{i,j}^*$ chosen so that 1) the size of $J_T^*$ is as small as possible and 2) the sum of the geodemographic weights of the elements of $J_T^*$ exceeds a minimum threshold $\Sigma_{j \in J_T^*} \omega_j > \kappa$. Territories are then ranked according to $$S(T) := \frac{\sum_{j \in J_T^*} \omega_j \cdot \hat{E}_{i_0,j}^*}{\sum_{j \in J_T^*} \omega_j}$$

with the greatest such score denoted S*. Territories having their top ranked geodemographic groups satisfy $\hat{E}_{i_0 j}^* > S^*$ and the top ranked geodemographic groups associated with each of these selected territories, i.e. $J_T^*$, are then sent to the metadata interest identification subcomponent 1854b.

Then in the metadata interest identification subcomponent 1854b territory specific advertising interests or keywords are determined (step S1846). Here, the delta matrix $\Delta(i,j) := \hat{E}_{ij} - E_{ij}$ for all $i \in I \cup \{i_0\}$ and $j \in J$ is factored as the product of the m×m matrix $\Omega = X(X^T X + \lambda \cdot \mathrm{Id})^{-1} X^T - \mathrm{Id}$ and the m×n matrix E using the factorization of $\hat{E}$. The media IP assets that give the largest positive contribution to the sum of the inner product of the $i_0$-th row of $\Omega$ and the j-th column of E most strongly inform the observed deltas $\{\Delta(i_0, j) | j \in J_T^* \cap J_\alpha\}$. The metadata (e.g. artists, subgenres, etc.) associated with these media IP assets are then collated and included as additional advertising interests or keywords in the initial advertising criteria on the appropriate third-party advertising platform for each territory.

In a specific embodiment, marketing campaign budget is set by the media IP asset owners/managers 1010 via the marketing platform 1040. The size of the budget at the territory level informs the optimal size of the initial geodemographic and interest targeting; when the predicted reach on the third-party advertising platform for a given geodemographic and interest description is too small then the cost per user will be higher and when the predicted reach is too large then the initial ads will not reach users likely to become highly engaged with the media IP asset.

| Use Case Illustration 1: Prompt for Territory Budget Allocation in response to 1854a | | |
|---|---|---|
| We have identified high growth potential audiences in the following territories. | Would you like to execute a marketing campaign in this territory? | How much would you like to spend (USD) on campaigns in each territory? |
| Brazil | Yes/No | $___ |
| US | Yes/No | $___ |

The list of territories generated in the territory identification subcomponent 1854a is sent to the marketing platform 1040 to be presented to the media IP asset managers/owners 1040 where they are prompted to allocate marketing campaign budget on a territory by territory basis (step S1847). The territories' highest ranked geodemographic groups $J_T^*$ and associated metadata advertising interests or keywords corresponding to the given media IP asset and budget allocation set by the media IP asset managers/owners 1010 (step S1848) are then sent by the DSP audience generation targeting description component 1854 and the marketing platform component 1040 respectively to the marketing campaign budget optimization component 1855.

In step S1849, for each territory, the marketing campaign budget is optimized using the highest ranked geodemographic groups and associated metadata advertising interests or keywords corresponding to the given media IP asset and budget allocation set by the media IP asset managers/owners. Specifically, in the marketing campaign budget optimization component 1855, these DSP specific targeting descriptions are converted into a third-party advertising platform description. Using the initial budget size set by media IP asset managers/owners 1010, an estimated reach of users on third-party advertising platforms is calculated from this description through APIs with third-party advertising platforms 1100.

Maximum territorial budget limits based on estimated third-party advertising platform reach are set by a campaign analytics database 1121 in the offline campaign attribution analytics hub 1120. This campaign analytics database 1121 provides category and territory specific benchmarks of overall third-party advertising platform campaign metrics (e.g. cost per click) from the ratio between campaign budget and estimated third-party advertising platform reach and is updated on a regular cadence from past marketing campaign metrics.

The marketing campaign budget optimization component 1855 continually interacts with third-party advertising platforms 1100 through APIs and updates the third-party advertising platform description by adding or removing geodemographic groups $j \in J_T^*$ prioritized according to $\hat{E}_{i_0j}^*$ to or from the DSP specific targeting descriptions and then converting these DSP specific descriptions to an appropriate third-party advertising platform description.

This process repeats until an acceptable estimated reach is obtained for each given territory and budget combination as determined by the campaign budget optimization model or until estimated reach can no longer be effectively expanded as there are no longer any high growth potential geodemographic groups available for a territory. If all available high growth potential geodemographic groups are used to generate the third-party advertising platform description before the lower bound on the required size of the estimated reach on third-party advertising platforms for a given budget is attained then the budget is reduced to the upper bound on the recommended budget size given that estimated reach and a notification is sent to the media IP asset managers/owners 1010 through the marketing platform component 1040.

| Use Case Illustration 2: Notification of Budget Change in 1855, reflecting that ad spend above $800 in this territory is unlikely to be effective and allocated budget has been reduced accordingly. | | |
|---|---|---|
| We have identified high growth potential audiences in the following territories. | Would you like to execute a marketing campaign in this territory? | How much would you like to spend (USD) on campaigns in each territory? |
| Brazil | Yes/No | $800 |
| US | Yes/No | $1000 |

The online audience generation component 1850 then sends the third-party advertising platform description generated by the marketing campaign budget optimization component 1855 to the marketing platform 1040 (step S1850).

Marketing Platform 1040

Briefly, according to one aspect described herein, the marketing platform 1040 is configured to interact with the marketing action analytics hub 1080 and create marketing campaigns based around high growth potential audiences and suggest marketing actions to media IP asset managers and owners 1010 to advertise to audiences predicted to be strongly engaged with their media assets on appropriate marketing channels via targeted marketing campaigns, including receiving the ranked list of media assets and corresponding recommended marketing actions and their advertising platform descriptions of audiences for the media assets in the ranked list as well as a ranked list of auxiliary media assets from the marketing action analytics hub 1080.

Figure 5:
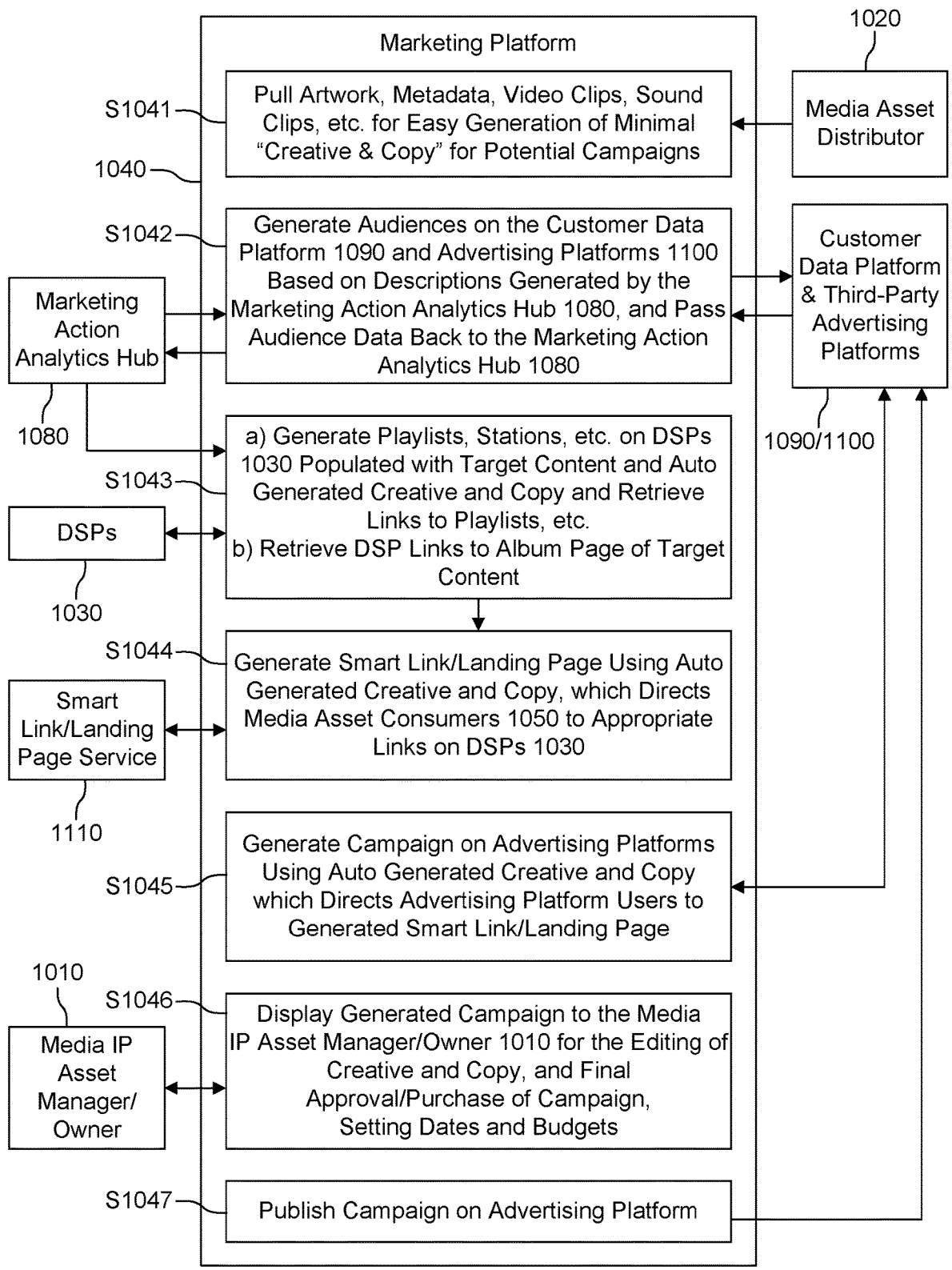
FIG. 5 is a schematic showing additional details of a marketing platform according to some embodiments of the disclosure.

In more detail, FIG. 5 is a schematic showing additional details of the marketing platform 1040 according to some embodiments of the disclosure. In a specific embodiment of the process, the receipt of vetted opportunities for a target media asset, coupled with media asset specific target audiences on each available advertising channel (e.g., direct via a customer data platform 1090 or through a third-party advertising platform 1100) from the marketing action analytics hub 1080, initiates the automatic generation of marketing campaigns for the potential purchase and execution by the target media IP asset managers/owners 1010.

In step S1041, in preparation for the potential generation of marketing campaigns, the media asset distributor 1020 sends promotional advertisement material, e.g. album art, sample sound/video clips, etc. to the marketing platform 1040 along with the media IP assets by the target media IP asset managers/owners 1010. In step S1042, when the marketing platform 1040 receives an audience description from the marketing action analytics hub 1080 (step S1850 in FIG. 7A), the marketing platform 1040 interfaces with the customer data platform 1090 and the associated third-party advertising platform 1100 via an API to retrieve details of the audience reachable on those platforms (the customer data platform 1090 and the associated third-party advertising platform 1100) determined by the given description. The marketing platform 1040 then passes details of the audience back to the marketing action analytics hub 1080 (marketing action evaluation 1086) for a final vetting of the opportunity (including the target media asset, coupled with the specific audience available on a given platform optimized for the particular media asset).

In step S1043, conditional on the receipt of a vetted opportunity from the marketing action analytics hub 1080, the marketing platform 1040 then interfaces with a DSP 1030 via an API to generate a playlist, station, etc. on the DSP 1030 featuring the target media asset along with additional auxiliary assets identified in the marketing action analytics hub 1080 (step S1085 in FIG. 4A). The marketing platform 1040 also interfaces with a DSP 1030 via an API to retrieve links to appropriate album or artist landing pages within the DSP client when the generation of playlists, stations, etc. is not a viable option for the particular DSP 1030.

In step S1044, the marketing platform 1040 interacts with a smart link and landing page service provider 1110 via an API to generate a landing page for the target media asset. This landing page directs media asset consumers 1050 to engage with the target media asset and auxiliary assets on the DSPs 1030 via the links retrieved in step S1043. In step S1045, the marketing platform 1040 interacts with the customer data platform 1090 and the third-party advertising platform 1100 via an API to generate campaigns on those platforms with vetted high ROI audiences (marketing action evaluation 1086 in FIG. 4A).

In step S1046, the marketing platform 1040 displays all generated campaigns to the manager/owner of the target media IP asset 1010 ranked in order of expected ROI, in a GUI which enables the manager/owner to inspect, edit, and set budgets and time frames and to make payments for the campaigns. In step S1047, conditional on authorization and payment by the media IP asset manager/owner 1010, the marketing platform 1040 interacts with the customer data platform 1090 and/or third-party advertising platforms 1100 via an API to publish the authorized campaign.

Campaign Attribution Analytics Hub 1120

Briefly, according to one aspect described herein, the campaign attribution analytics hub 1120 is configured to use data from the consumption database 1060, the marketing platform 1040, the customer data platform 1090, and third-party advertising platforms 1100 to accurately attribute the effect of a marketing campaign, including collecting new campaign specific trend data after a marketing campaign has been launched from the consumption database 1060 as soon as it is processed and made available for analysis.

Figure 6:
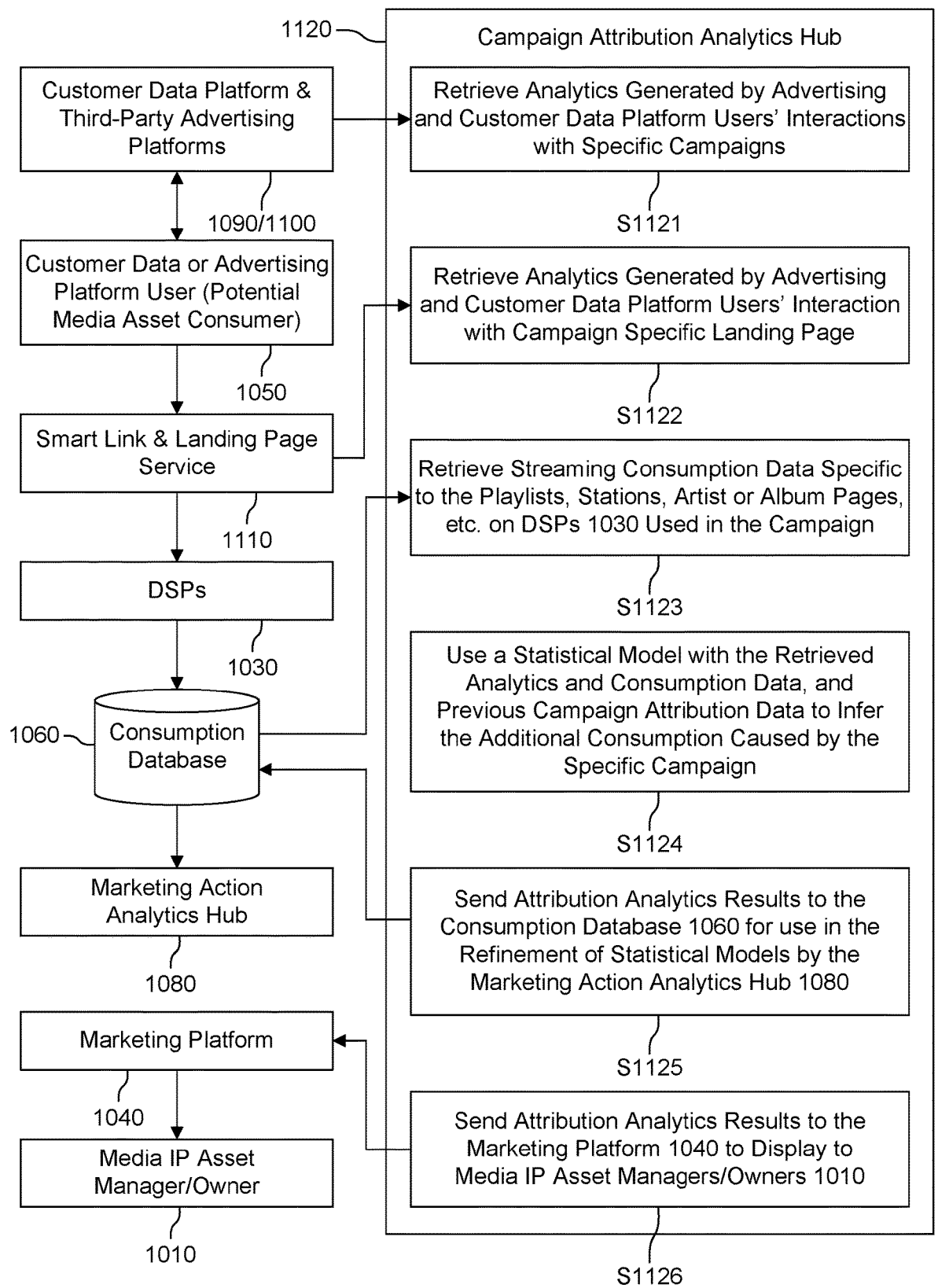
FIG. 6 is a schematic showing additional details of a campaign attribution analytics hub according to some embodiments of the disclosure.

In more detail, FIG. 6 is a schematic showing additional details of the campaign attribution analytics hub 1120 according to some embodiments of the disclosure. In a specific embodiment of the process, analytics data is pulled from a variety of sources to attribute the increase in streaming consumption caused by running the generated campaign authorized by the media IP asset manager/owner 1010 in step S1046 in FIG. 5, and published in step S1047 in FIG. 5.

In step S1121, the analytics generated by customers in the customer data platform 1090 and/or users of third-party advertising platforms 1100 interacting with the campaign are pulled from these platforms to the campaign attribution analytics hub 1120. In step S1122, the analytics generated by interactions with the landing page(s) generated specifically for the campaign (step 1044 in FIG. 5) are pulled to the campaign attribution analytics hub 1120. In step S1123, the consumption data relevant to the campaign, i.e., the data corresponding with the consumption on the DSPs related to the links retrieved and generated in step S1043 of FIG. 5, is retrieved from the consumption database 1060.

In step S1124, the campaign attribution analytics hub 1120 uses a statistical model in conjunction with the data retrieved in steps S1121-S1123 to infer the increases in streaming consumption directly caused by the campaign. In step S1125, the campaign attribution analytics hub 1120 sends the results of the attribution analysis to the consumption database 1060 for storage and later use in the refinement of models which are then used by the marketing action analytics hub 1080.

In step S1126, the campaign attribution analytics hub 1120 sends the results of the attribution analysis to the marketing platform 1040 for display to the media IP asset managers/owners 1010.

In a specific embodiment of the system and process schematically illustrated in FIG. 6, analytics data is pulled from a customer data platform 1090 and third-party advertising platforms 1100 and combined with the relevant campaign consumption data from the consumption database 1060 in the campaign attribution analytics hub 1120 (steps S1121-S1123).

In step S1124 a forecast model is trained to predict the background discovery and re-engagement rates within the streaming context of the media asset links on the DSPs (e.g., playlist or album page) associated with the marketing campaign. The model is trained to utilize cross correlations between the streaming context of the associated media asset link and other engagement contexts both within the same DSP as well as on other DSPs to control for exogenous increases in streaming which are not directly caused by marketing efforts. Let $D_t$ and $R_t$ denote the multivariate discovery and re-engagement event time series of the target content corresponding with the associated media asset links respectively; let $C_t$ denote the multivariate time series of ad-campaign click events directing media asset consumers 1050 to the target content via the associated media asset links; and let $A_t$ denote the multivariate auxiliary time series of discovery and re-engagement events occurring within all other streaming contexts and on all other DSPs excepting those which media asset consumers 1050 are directed to via the associated media asset links. Then a prediction model $$\hat{D}_{t:t+p}, \hat{R}_{t:t+p} \sim N(\mu,\sigma) \sim f(D_{t-q:t-1}, R_{t-q:t-1}, A_{t-q:t+p}, C_{t-q:t+p})$$

is fit using the historical consumption features described above, where p is the campaign duration, q delineates the lagged features used as inputs to the model and the model f is operationalized as a gated convolutional neural network, trained by minimizing approximate cross entropy loss. This allows for the robust inference of the causal impacts of the ad-campaign discovery and re-engagement with the target content.

EXAMPLES

The following describes example usage scenarios for the system and process disclosed herein. The present disclosure may be used by companies whose customers are IP holders, that is for example, people who own and manage the rights to sound recordings.

In the example usage scenario, a media IP asset manager 1010, and customer of a distribution service, distributes their catalog of sound recordings through the digital media asset distributor 1020. The media IP asset manager 1010, through a GUI, specifically the marketing Platform 1040, selects a media IP asset $i_0$ and marketing campaign goal for which to execute a marketing campaign, which is then sent to the online model audience generation component 1850.

Behind the scenes from the perspective of the media IP asset manager 1010 the online model audience generation component 1850 sends the media IP asset and marketing campaign goal to the model selection component 1851. The online model selection component 1851 determines the appropriate asset category for the IP asset and for the purposes of this example, $i_0$ is in the appropriate statistical model for the category associated with the media IP asset, i.e. the online model update component 1852 is not utilized in this example.

In this example usage scenario, a subset of the row of the engagement matrix $E_{i_0}$ corresponding to $i_0$ is given by

| [Engagement Metric] | M, 18-24, New York NY, Premium Spotify | F, 25-34, Ireland, Ad-Supported YouTube | F, 25-34, Para, BR, Ad-Supported Deezer | F, 25-34, New York NY, Premium Spotify | |
|---|---|---|---|---|---|
| ($i_0$) | −1 | 9 | 8 | 4 | ... |

The corresponding subset of the row of the predicted engagement matrix $\hat{E}_{i_0}$ is given by

| [Predicted Engagement Metric] | M, 18-24, New York NY, Premium Spotify | F, 25-34, Ireland, Ad-Supported YouTube | F, 25-34, Para, BR, Ad-Supported Deezer | F, 25-34, New York NY, Premium Spotify | |
|---|---|---|---|---|---|
| ($i_0$) | −3 | 1 | 10 | 15 | ... |

These two matrices are then used to determine the high growth potential geodemographic groups in the high growth potential audience identification component 1853 subject to the marketing campaign goal by computing the delta $\Delta(i_0, j) := \hat{E}_{i_0,j} - E_{i_0,j}$ for each geodemographic group $j \in J$, where J is the set of geodemographic groups in the columns of $E_{i_0}$. For the purposes of this example usage scenario, the marketing campaign goal prioritizes audience expansion corresponding to geodemographic groups having anomalously low levels of engagement, that is $$\{j \in J | \Delta(i_0, j) \gg \mu_{i_0} + \mu_{i_0} + \sigma_{i_0}\}$$

where $\mu_{i_0}$ and $\sigma_{i_0}$ are the mean and the standard deviation of $\{\Delta(i_0, j)|j \in J\}$ respectively. The high growth potential audience identification component 1853 then identifies the geodemographic group F, 25-34, New York N.Y., Premium Spotify, with $\Delta(i_0, j)=15-4=11$, as one such group and this informs the computation of its goal-weighted predicted engagement score $\hat{E}_{i_0j}*$. Goal-weighted predicted engagement scores are then used in the subsequent DSP audience generation targeting description component 1854.

In the territory identification subcomponent 1854a the US and Brazil are determined to be the territories sent to the marketing platform 1040 to be presented to the media IP asset managers 1010 according to a ranking metric based on an average of the goal-weighted predicted engagement scores $\hat{E}_{i_0j}*$ for the top scoring geodemographic groups in those territories, e.g. F, 25-34, Para, BR, Ad-Supported Deezer and F, 25-34, New York N.Y., Premium Spotify, weighted by the geodemographic weights provided by the model truncation component 1822 of the offline model generation component 1820. Both territories are authorized for campaign execution with initial marketing budgets of $1000 USD each by the media IP asset manager 1010 through the marketing platform 1040.

Additional advertising interests Artist B, Artist C and Genre G and Artist B, Artist D and Genre G are then determined by the metadata interest identification 1854b for Brazil and the US respectively for use in the initial advertising criteria on the appropriate third-party advertising platform 1100.

The DSP audience generation targeting description 1854 sends the set of territories, high growth potential geodemographic groups and additional advertising interests to the marketing campaign budget optimization component 1855 where they are converted into third-party advertising platform descriptions. In this example, a subset of high growth potential geodemographic groups including F, 25-34, New York N.Y., Premium Spotify, and advertising interests Artist B, Artist C and Genre G are used to inform the third-party advertising platform description for the US territory marketing campaign for a budget of $1000 USD and a separate subset of high growth potential geodemographic groups and advertising interests Artist B, Artist D and Genre G are used to inform the third-party advertising platform description for the Brazil territory marketing campaign for a reduced budget of $800 USD which is determined by the campaign budget optimization component 1855 to be the maximum viable budget given the high growth potential geodemographic groups available in Brazil. The online audience generation component 1850 then sends the third-party advertising platform description generated by the marketing campaign budget optimization component 1855 to the marketing platform 1040 for the execution of the marketing campaign.

Architecture

Figure 8:
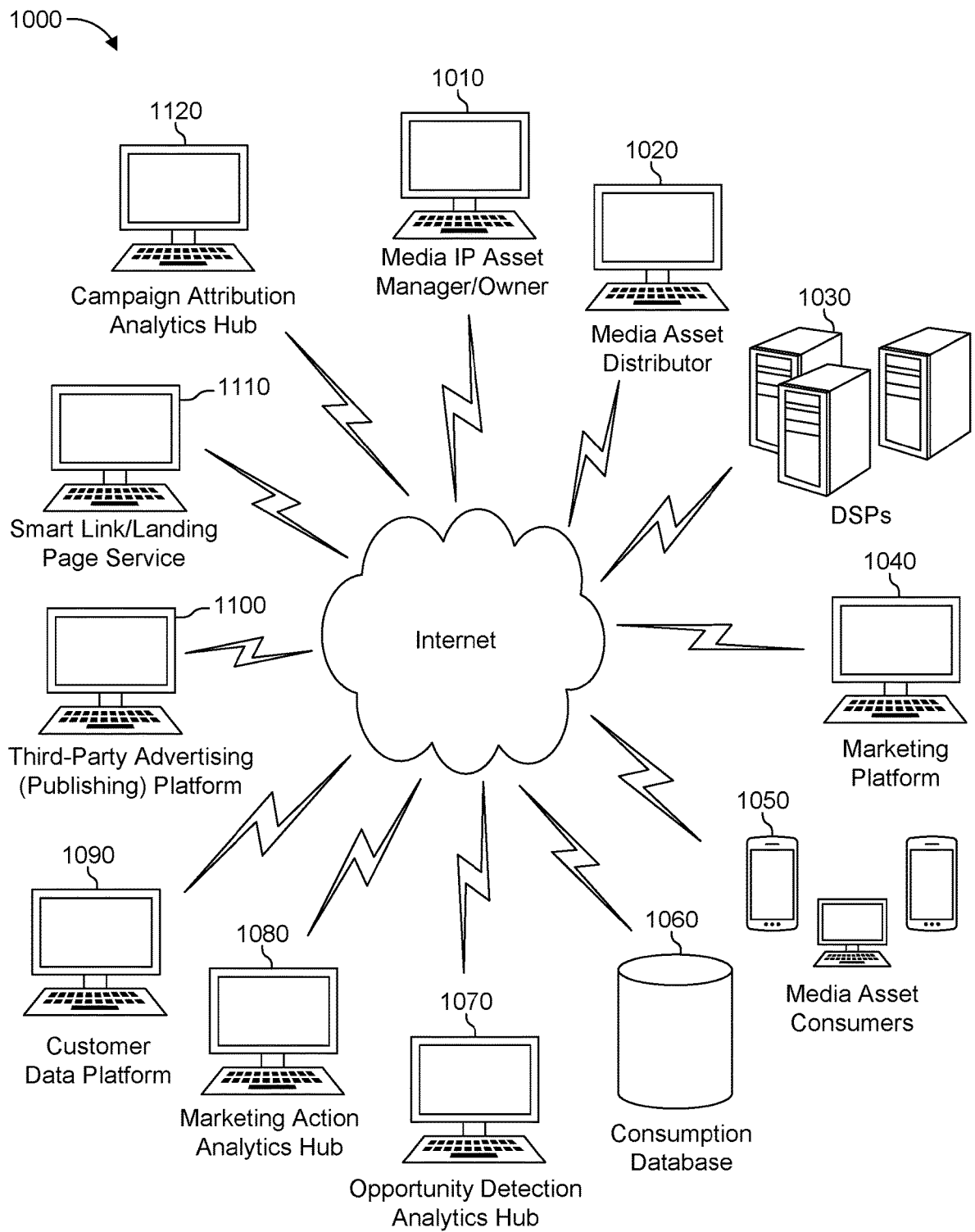
FIG. 8 is a schematic showing example architecture of the marketing analytics pipeline according to some embodiments of the disclosure.

FIG. 8 is a schematic showing example architecture of the marketing analytics pipeline 1000 according to some embodiments of the disclosure. The marketing analytics pipeline 1000 can be implemented by a plurality of computing devices. The computing devices may include, for example, personal computers, network computers, game consoles, work stations, application servers, databases, and personal communication devices. The computing devices may communicate with each other via the internet. The computing devices may be dedicated "hard-wired" devices, or programmable devices. Each of the computing devices shown in FIG. 11 may be an integrated unit or may be implemented using a plurality of distributed computing devices.

Each of the computing devices may include one or more processors, computer-readable memory media, and a memory. The processors may operate to execution instructions stored in the memory. The computer-readable memory media, for example, hard disk drives, store computer-executable instructions that implement the methods described above. The computing devices may include input and output devices, such as a keyboard, a mouse, and a monitor, for example. Each computing device may include a network interface that enables the computing device to connect to the internet, and communicate with other computing devices in the marketing analytics pipeline 1000.

The embodiments illustrated and discussed in this specification are intended only to teach those skilled in the art how to make and use the disclosure herein. In describing embodiments of the disclosure herein, specific terminology is employed for the sake of clarity. However, the disclosure herein is not intended to be limited to the specific terminology so selected. The above-described embodiments of the disclosure herein may be modified or varied, without departing from the disclosure herein, as appreciated by those skilled in the art in light of the above teachings. It is therefore to be understood that, within the scope of the claims and their equivalents, the disclosure herein may be practiced otherwise than as specifically described.

The invention claimed is:

1. A method for authorizing execution of targeted marketing campaigns for streaming media intellectual property (IP) assets, the method comprising:
   streaming, by media asset consumers, of media IP assets distributed to digital service providers (DSPs) via a media asset distributor, for which the consumers have obtained streaming access through subscription or agreement to other terms of use from the DSPs;
   documenting and compiling the streaming interactions of the consumer into a transaction-level trend data report, wherein items in the report comprise specific media IP assets;
   implementing a marketing analytics pipeline that:
      receives the transaction-level trend data report,
      compiles the streaming interactions of individual consumers from the transaction-level trend data report into specific geodemographic groups including geographic regions, genders, ages and DSP subscription status, and without identification of individual consumers,
      creates a ranked list of media IP assets and corresponding marketing actions,
      retrieves links on the DSPs for the media IP assets in the ranked list of media IP assets, the links being retrieved by use of APIs of the DSP and/or a smartlink API,
      creates for each media IP asset in the ranked list of media IP assets, using the smartlink API, one or more landing pages comprising the associated links on the DSPs, and
      creates marketing campaigns for media IP asset managers/owners including the one or more landing pages comprising the links on the DSPs for each of the one or more media IP assets in the ranked list;
   presenting the ranked list of media IP assets and corresponding marketing actions and marketing campaigns to the media IP asset managers/owners in a graphical user interface (GUI), wherein the GUI includes a media IP asset and a corresponding listing of marketing campaigns, and wherein the GUI enables the media IP asset managers/owners to manage funds, set territory specific budgets and store promotional advertisement material for the marketing campaigns;

receiving modifications made via the GUI by the media IP asset managers/owners; and receiving authorization to execute the marketing campaigns from the media IP asset managers/owners, wherein the marketing analytics pipeline comprises:

a marketing action analytics hub configured to receive the growth and re-engagement opportunities from an opportunity detection analytics hub or from a marketing platform directly and to identify high growth potential audiences using predictive models of engagement; and a marketing platform configured to interact with the marketing action analytics hub and to create targeted marketing campaigns based around the high growth potential audiences, the marketing platform further being configured to suggest specific marketing actions to the media IP asset managers/owners, wherein the marketing actions are designed for delivery to the high growth potential audiences on appropriate marketing channels via the targeted marketing campaigns;

wherein the marketing action analytics hub is comprised of an offline model generation component and an online audience generation component and uses a targeting method based on the specific geodemographic group data compiled from the streaming interactions of individual consumers and the interests of these groups for generating descriptions of high growth potential audiences, wherein the offline model generation component is configured to use the compiled streaming interactions of geodemographic groups contained in a consumption database to fit statistical models based on consumption patterns of an entirety of distributed media IP assets on a regular cadence by clustering media IP assets into categories and employing an alternating least squares framework to generate a specific matrix factorization for each category by approximating an engagement matrix E as a product of two latent factor matrices $E_{est}$:=$XY^\tau$, where $Y^\tau$ is the matrix transpose of Y;

wherein the choice of the rows and columns of E are informed by the truncation of media IP assets and geodemographic groups based on consumption thresholds, and the values of the entries of E are evaluations of a scalar valued multivariable function $f$ on vectors in a consumption tensor whose dimensions correspond to media IP assets, geodemographic groups, and streaming channels, X is an m×k matrix, Y is an n×k matrix and $E_{est}$ is itself an approximation of the best rank k≤min(m,n) approximation of E that minimizes a cost function $$\text{cost}(X, Y) := \sum_{(i,j) \in S_{train}} (E_{ij} - X_i Y_j^T)^2 + \lambda \left( \sum_{i \in I} \|X_i\|^2 + \sum_{j \in J} \|Y_j\|^2 \right)$$

over all possible choices of X and Y such that $S_{train}$ and $S_{test}$ form a partition (disjoint nonempty subsets that cover the whole set) of indices of E, $X_i$ and $Y_j$ respectively denote the i-th and j-th rows of the matrices X and Y and I and J are truncated sets of media IP assets and geodemographic groups respectively;

wherein λ and k are two hyperparameters for each category determined by a cross validation scheme that minimizes the sum of squared errors SSE(k, λ):= $\sum_{(i,j) \in S_{test}} (\hat{E}_{ij}^{(k,\lambda)} - E_{ij})^2$ using an adaptive grid search where $\hat{E}_{ij}^{(k,\lambda)}$ is the (i, j)-entry in the matrix $E_{est}^{(k,\lambda)}$ denoting the estimate obtained from the alternating least squares component for a given hyperparameter pair (k, λ), where the chosen k and λ are then used to train the model on the combined train and test dataset, i.e. $S_{train}$ is now I×J, to minimize the cost(X,Y) to fit $E_{est}$=$XY^\tau$;

wherein $\|X_i\|$ and $\|Y_j\|$ are the $l^2$ norms of $X_i$ and $Y_j$ respectively, where the analytic expressions that minimize the cost function for $X_i$ and $Y_j$ for a fixed Y and a fixed X respectively are approximated by iteratively applying $X_i = (ED^{(i)}Y((Y^\tau Y + \lambda \cdot Id)^{-1})^\tau)_i$ and $Y_j = (E^\tau D^{(j)} X((X^\tau X + \lambda \cdot Id)^{-1})^\tau)_j$, where Id is the appropriately sized identity matrix, $D^{(i)}$ is an n×n diagonal matrix with the j-th diagonal element one if (i, j)∈$S_{train}$ and zero otherwise, and similarly for the m×m matrix $D^{(j)}$.

2. The method according to claim 1, wherein the online audience generation component is comprised of a high growth potential audience identification component configured to receive both: (1) the compiled streaming interactions of geodemographic groups contained in the consumption database, the media IP assets and the marketing campaign goals from the opportunity detection analytics hub or directly from the media IP asset managers/owners through the marketing platform, and (2) the trained statistical models from an online model selection component or an online model update component to produce a subset of high growth potential geodemographic groups chosen according to a goal-weighted predicted engagement score calculated by assessing both the engagement predicted by the statistical model in each geodemographic group as well as the alignment with the received marketing campaign goal for each geodemographic group where alignment is determined using both the model prediction of engagement and the observed engagement of each geodemographic group, for the purpose of ensuring consistency between the targeting priorities as indicated by the campaign goal and as represented by the chosen high growth potential geodemographic groups.

3. The method according to claim 2, wherein the high growth potential audience identification component is configured to receive both: (1) the compiled streaming interactions of geodemographic groups contained in the consumption database, the media IP assets and the marketing campaign goals from the opportunity detection analytics hub or directly from the media IP asset managers/owners through the marketing platform, and (2) the trained statistical models containing media IP asset category dependent matrices E and Ê and a set of geodemographic groups J from the online model selection component or the online model update component, to produce a subset of high growth potential geodemographic groups $J^*(i_0) \subseteq J$, where geodemographic groups $j \in J^*(i_0)$ for a media IP asset $i_0$ are chosen according to the goal-weighted predicted engagement score, wherein the goal-weighted predicted engagement score $\hat{E}_{i_0 j}$ is calculated by applying marketing campaign goal weights to three broad classes of geodemographic groups defined by {j∈J|Δ$(i_0, j) \gg \mu_{i_0} + \sigma_{i_0}$} associated with marketing campaign goals of audience expansion, {j∈J|Δ$(i_0, j) \ll \mu_{i_0} - \sigma_{i_0}$} associated with marketing campaign goals of growth trend acceleration and {j∈J|$\mu_{i_0} - \sigma_{i_0} \ll \Delta(i_0, j) \ll \mu_{i_0} + \sigma_{i_0}$} associated with marketing campaign goals of sustaining audience engagement, where $\Delta(i_0, j) := \hat{E}_{i_0 j} - E_{i_0 j}$, and $\mu_{i_0}$ and $\sigma_{i_0}$ are the mean and the standard deviation of {Δ$(i_0, j)$|j∈J} respectively.

4. The method according to claim 3, wherein in the online audience generation component, the online model update component is configured to include a media IP asset $i_0$ that is not present in its respective category dependent set of media IP assets I selected in the online model selection component by appending a row $E_{i_0}$ to the matrix E obtained from applying the function $f$ on the tensor vectors corresponding to the consumption of the media IP assets $i_0$ in the geodemographic groups J and then iterating the alternating least squares framework where the initialization of the optimization step is informed by the matrices X and Y of the category dependent offline trained model to generate an adapted trained online statistical model $\hat{E}$.

5. The method according to claim 3, wherein the online audience generation component is further comprised of a metadata interest identification component configured to send a collection of metadata that most strongly inform the observed predicted errors of a set $J^*(i_0)$ for a media IP asset $i_0$ as additional territory specific advertising interests or keywords in the initial advertising criteria on appropriate third-party advertising platforms by collecting the metadata of the media IP assets that provide the largest contribution to the sum of the inner product of the $i_0$-th row of $\Omega$ and the j-th column of E where $\Omega = X(X^\tau X + \lambda \cdot Id)^{-1} X^\tau \cdot Id$.

6. The method according to claim 3, wherein the online audience generation component is further comprised of a marketing campaign budget optimization component that creates a third-party advertising platform description with optimal estimated reach by continually interacting with third-party advertising platforms through APIs and adding additional geodemographic groups j prioritized according to $\hat{E}_{i_0,j}^*$ to the DSP specific targeting descriptions and then converting these DSP specific descriptions to an appropriate third-party advertising platform description until either the optimal estimated reach is obtained for each territory and budget as determined by the campaign budget optimization model or until there are no longer any high growth potential geodemographic groups available, in which case the budget is reduced according to maximum territorial budget limits based on estimated third-party advertising platform reach determined by a historical campaign analytics database trained offline.

7. The method according to claim 1, wherein the marketing analytics pipeline receives multiple transaction-level trend data reports corresponding respectively to multiple DSPs.

8. The method according to claim 7, wherein the multiple transaction-level trend data reports are received at a regular cadence.

* * * * *